United States Patent
Ozawa et al.

(10) Patent No.: US 8,830,541 B2
(45) Date of Patent: Sep. 9, 2014

(54) IMAGE READING APPARATUS

(75) Inventors: Junya Ozawa, Yamanashi-ken (JP); Satoshi Tanaka, Yamanashi-ken (JP); Fumimasa Amemiya, Yamanashi-ken (JP); Shinnosuke Enomoto, Yamanashi-ken (JP)

(73) Assignee: Nisca Corporation, Minamikoma-gun, Yamanashi (JP)

( * ) Notice: Subject to any disclaimer, the term of this patent is extended or adjusted under 35 U.S.C. 154(b) by 30 days.

(21) Appl. No.: 13/578,450

(22) PCT Filed: Mar. 3, 2011

(86) PCT No.: PCT/JP2011/054921
§ 371 (c)(1),
(2), (4) Date: Aug. 10, 2012

(87) PCT Pub. No.: WO2011/108645
PCT Pub. Date: Sep. 9, 2011

(65) Prior Publication Data
US 2012/0307322 A1    Dec. 6, 2012

(30) Foreign Application Priority Data

Mar. 5, 2010  (JP) ................................. 2010-049916
May 10, 2010  (JP) ................................. 2010-108623

(51) Int. Cl.
H04N 1/04      (2006.01)
H04N 1/028     (2006.01)
H04N 1/03      (2006.01)
G03G 15/04     (2006.01)
H04N 1/00      (2006.01)
H04N 1/10      (2006.01)

(52) U.S. Cl.
CPC ............ *H04N 1/02835* (2013.01); *H04N 1/103* (2013.01); *H04N 1/0285* (2013.01); *H04N 1/0303* (2013.01); *H04N 1/0305* (2013.01); *G03G 15/0409* (2013.01); *H04N 1/00822* (2013.01); *H04N 2201/0081* (2013.01); *H04N 1/02845* (2013.01); *H04N 1/00806* (2013.01); *H04N 1/0289* (2013.01); *H04N 1/0287* (2013.01); *H04N 1/1017* (2013.01)
USPC ............ 358/475; 358/474; 358/496; 358/497

(58) Field of Classification Search
USPC ......................... 358/475, 474, 496, 497, 498
See application file for complete search history.

(56) References Cited

U.S. PATENT DOCUMENTS 8,379,275 B2 *  2/2013  Tahk et al. .................... 358/475

FOREIGN PATENT DOCUMENTS

| JP | 1999-317854 | * 11/1999 | ............... H04N 1/04 |
| JP | H11-317854 A | 11/1999 | |
| JP | 2000-123152 | 4/2000 | |
| JP | 2000-224379 A | 8/2000 | |
| JP | 2002-341476 A | 11/2002 | |
| JP | 2005-234297 | 9/2005 | |
| JP | 4083042 B1 | 2/2008 | |

* cited by examiner

*Primary Examiner* — Houshang Safaipour
(74) *Attorney, Agent, or Firm* — Manabu Kanesaka

(57) ABSTRACT

An apparatus is provided capable of guiding regular reflected light from a reading surface to a reflecting mirror when light is irradiated from two directions from light sources to the reading surface, and is suitable to read a gloss image. The light sources for irradiating light to the reading surface from the two directions of different angles are configured of a first light emitter and a second light emitter, a mirror reflecting surface for specularly reflecting light and a translucent surface for passing light therethrough being formed on the surface of a reflecting member for deflecting light from the reading surface to a predetermined reading light path direction, the first light emitter being arranged between the platen and the platen side surface of the reflecting member, the second light emitter being arranged at the back surface of the reflecting member so as to irradiate light on the reading surface through the translucent surface.

18 Claims, 21 Drawing Sheets

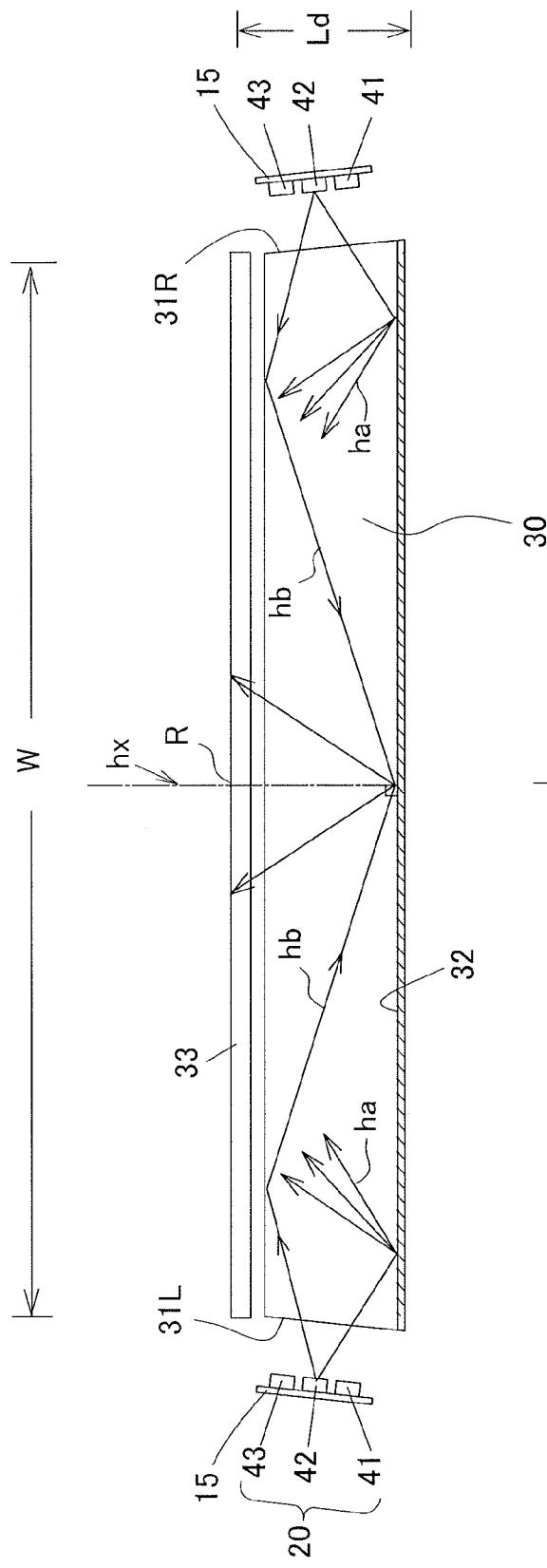
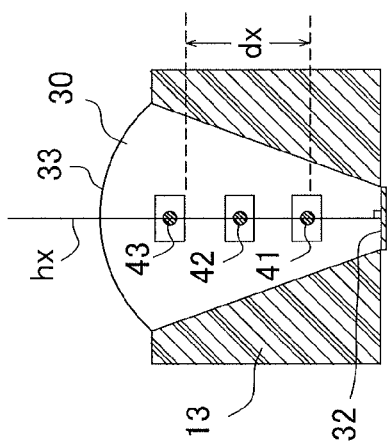
FIG. 12(a)
FIG. 12(b)

IMAGE READING APPARATUS

TECHNICAL FIELD

The present invention relates to an image reading apparatus mounted in a scanner apparatus, copier, facsimile, etc., and more particularly, to improvements in a light source mechanism for changing an irradiate method to read in accordance with an original document image.

BACKGROUND ART

Generally, an image reading apparatus such as a scanner apparatus, copier or the like is configured of a platen, a light source for irradiating reading light on a reading surface on the platen, reflecting mirrors for reflecting light reflected from the reading surface to predetermined directions, a condenser lens for forming an image by light from the mirrors, and a sensor for photoelectric conversion for converting light from the lens through the condenser lens into electricity.

For example, Japanese Laid-Open Patent Publication (Kokai) No. 2005-234297 (Patent Document 1) discloses an image reading apparatus comprised of a reading mechanism with a reducing optical system. This document discloses an image reading apparatus in which, in a carriage reciprocating along a platen, there are provided a light source lamp, a plurality of mirrors for reflecting light reflected from a reading surface to predetermined directions, and a sensor for photoelectric conversion for converting light from the mirrors through a condenser lens into electricity.

In such an image reading apparatus, light is irradiated from the light source lamp to the reading surface at a predetermined angle direction, and diffusion light from the reading surface is reflected by the reflecting mirrors to a reading light path direction. That is, since the reading surface of an original document is not a complete plane but is a fine concave-convex surface (for example, roughness of the surface of a paper), linear light having a predetermined width is irradiated to read an image by light directing to the mirror surface of the mirror (diffusion light). In this case, when an image (for example a gilt character) is formed on an image surface having a smoothly-shaped gloss surface, there is a phenomenon where light from the light source lamp does not direct to the regular reflection direction and does not enter into the reflecting mirrors. Due to this, it is known that the gloss image is read as black.

Accordingly, in Japanese Patent Gazette No. 4083042 (Patent Document 2), for example, there is proposed to provide a diffusion light source for irradiating light from a predetermined angle to a reading surface, and a regular reflection light source for irradiating light from directly below the reading surface; and from an original document including a gloss image, read data is obtained by synthesizing read data obtained by irradiating light from the diffusion light source and read data obtained by irradiating light from the regular reflection light source.

In this document 2, there is proposed a mechanism in which light sources are arranged in two directions where light from a first light source is irradiated in a direction inclined by a predetermined angle ($\theta 1$) with respect to a reading light directing from the reading surface to a reflecting mirror, and similarly light from a second light source is irradiated in the direction inclined by an angle $\theta 2$. Then, the angles are set as $\theta 1 > \theta 2$ so as to guide the reflected light of diffusion light from the first light source to the reflecting mirror. To this end, it is most preferable to arrange the second light source in a light path incident on the reflecting mirror.

However, since it is impossible to arrange the second light source in the light path incident on the reflecting mirror ($\theta 2 = 0$ degree), in the apparatus disclosed in the document 2, the second light source is arranged at a position close to the light path with a degree in which the second light source does not block the light path incident from the reading surface on the reflecting mirror. In such an arrangement of the structure, in order to get closer the incident angle ($\theta 2$) irradiated from the second light source to the reading surface to be 0 degree, the light path length from the light source to the reading surface must be kept long. Therefore, a problem has been known in which the apparatus becomes large.

Further, in Japanese Laid Open Patent Publication (Kokai) No. 2000-123152 (Patent Document 3), there is proposed to configure a reflecting mirror by a half mirror, and to arrange a second light source at the back surface side of the reflecting mirror arranged directly below a reading surface.

Note that Japanese Laid Open Patent Publication (Kokai) No. H11-317854 (Patent Document 4) discloses an image reading apparatus utilizing a fluorescent light as a light source, wherein a flat glass is arranged on an opening portion of a glass tube which construct the fluorescent light; a reflection film is provided on a part of an outer surface of the flat glass; a light flux is emitted from a part, on which a reflecting film of the flat glass is not provided, to irradiate an original document; and light flux from the original document is reflected from a part on which the reflecting film of the flat glass is provided. In this document 4, a problem is to higher the lighting efficiency of the fluorescent light which has a low brightness and large light emitting area, so as to downsizing the apparatus, and there is no disclosure about an apparatus in which light is irradiated from two different directions to a reading surface of an image.

PRIOR ART DOCUMENTS

Patent Document

Patent Document 1: Japanese Laid-Open Patent Publication (Kokai) No. 2005-234297
Patent Document 2: Japanese Patent Gazette No. 4083042
Patent Document 3: Japanese Laid-Open Patent Publication (Kokai) No. 2000-123152
Patent Document 4: Japanese Laid-Open Patent Publication (Kokai) No. H11-317854

SUMMARY OF THE INVENTION

Problems to be Solved by the Invention

As described above, when linear light is irradiated on a reading surface of an image, it is required in a gloss image reading to irradiate light from two directions of different angles wherein diffusion light of reflected light of an image from a first light source is entered into a reflecting mirror, and regular reflection light is entered into the reflecting mirror. To this end, in the method proposed in the previously described document 2, as shown in FIG. 21($a$), a second light source 100 is arranged at a position close to a light path incident on a reflecting mirror 101 so as to make the incident angle ($\theta 2$) for irradiating a reading surface closer to 0 degree. In such an arrangement structure, it is impossible to make the incident angle ($\theta 2$) closer to 0 degree unless the path length L from the light source 100 to the reading surface is made to be long. If an error in this angle $\theta 2$ is large, a reading error will be generated.

When the second light source is arranged at a position close to the reflecting mirror as described above, it is considered to minimize the reflecting mirror. However, in the minimization of the reflecting mirror, a mirror substrate must be formed to have a predetermined length with a narrow width along a reading line, so that twisting and deformation of the mirror substrate become problems. That is, when an elongated mirror with a narrow width is mounted and supported in a carriage, it is distorted and deformed due to impact or heat so that problems of position displacement of the reading path are caused. Along with this, the end surface of miniaturized reflecting mirror closes near the reading path so that problems are caused in that there is a mechanical vignetting of light by the end surface or an interference with light from the other reflecting mirrors may occur.

Further, in the previously described document 3, it is proposed that the reflecting mirror is configured of the half mirror 101. In this method, as shown in FIG. 21(b), the diffuse light sources 105a and 105b are arranged in the directions inclined by the predetermined angle ($\theta 1$) with respect to the reading surface 104; light from the half mirror 103 is guided to the reading light path direction, while light is irradiated from the second light source 106 to the half mirror 103 so as to irradiate light on the reading surface 104 by an angle ($\theta 1 = 90$ degrees). In this case, by configuring the reflecting mirror by the half mirror, if, for example, the translucency is 50%, it is impossible to guide a predetermined amount of light to a sensor for photoelectric conversion unless the light amounts (light emitting amounts) of the first light source and the second light source are made twice. Accordingly, problems are caused in that the power consumption is large and a countermeasure for heat generation at the light emitting portion is necessary.

Accordingly, the inventors of the present invention tried to miniaturize (downsizing) a reflecting mirror in order to arrange a second light source at a position closer to the reflecting mirror. However, this miniaturization of the reflecting mirror has caused many problems. The miniaturization of the reflecting mirror needs the formation of a mirror substrate having a predetermined length with a narrow width along the reading line so that the twisting and deformation of the mirror substrate become problems. That is, when an elongated mirror with a narrow width is mounted and supported in a carriage, it is distorted and deformed due to impact or heat so that problems of position displacement of the reading path are caused. Along with this, the end surface of miniaturized reflecting mirror closes near the reading path so that problems are caused in that there is a mechanical vignetting of light by the end surface or an interference with light from the other reflecting mirrors may occur. This is caused because, when the flat-shaped reflecting mirror is miniaturized, the end face of the mirror enters into the reading light path so that light transmission at the end face becomes unstable.

It is a principal problem of the present invention to provide an image reading apparatus for enabling to guide a part of light as regular reflecting light from a reading surface to a reflecting mirror, so that a physical interference between light from the light source and the reflecting mirror is at a low risk and the apparatus is miniaturized.

It is a second problem of the present invention to provide the image reading apparatus in which the reflecting mirror is not twisted and deformed, and the structure is simple.

Further, it is a third problem of the present invention to provide the image reading apparatus in which the amount of irradiated light is not partially lowered by a concave, convex and distortion of the image surface of the original document.

Means to Solve the Problems

To solve the above problems, the present invention is characterized in that light sources for irradiating linear light to a reading surface from two directions of different angles are configured of a first light emitter and a second light emitter, a mirror reflecting surface for mirror reflecting light and a translucent surface transmissive for light being formed on a surface of a flat-shaped reflecting member for reflecting light from the reading surface to a predetermined reading light path direction. Then, the first light emitter is arranged between a platen and the surface of the reflecting member, and the second light emitter is arranged at a back surface side of the reflecting member so that light passes through the mirror reflecting surface and irradiate on the reading surface.

The configuration will be described specifically. It is configured of a platen (2, 3) having a reading surface (R); a light source (9) for irradiating light on the reading surface; a reflecting mirror (10) for reflecting light reflected from the reading surface to a predetermined light path direction; a condenser lens (7) for condensing light from the reflecting mirror; and a sensor (8) for subjecting light from the condenser lens into photoelectric conversion. The light source is configured of a first light emitter (9a) and second light emitter (9b) for irradiating light on the reading surface from at least two directions; and the reflecting mirror is configured of a plurality of reflecting members (10) for reflecting light from the reading surface to a predetermined reading path direction. One (10a) of the reflecting members is arranged to be inclined at a predetermined angle with respect to the platen, and is configured of a flat-shaped translucent substrate; a mirror reflecting surface for specularly reflecting light and a translucent surface transmissive for light are formed on a part of the surface of the reflecting member; the first light emitter being arranged between the platen and the side of the mirror reflecting surface of the reflecting member; and the second light emitter is arranged at the back surface side of the mirror reflecting surface of the reflecting member.

The irradiating angle ($\theta 2$) of the center of light to be irradiated from the second light emitter to the reading surface is set to be smaller than the irradiating angle ($\theta 1$) of the center of light to be irradiated from the first light emitter to said reading surface; and the second light emitter is arranged in such a way that the center of the linear light to be irradiated on the reading surface passes through the translucent surface ($10y$) between the end surface ($10z$) of the reflecting member and the mirror reflecting surface ($10x$). By this configuration, since the center of light from the second light emitter passes through the translucent surface, the irradiating angle $\theta 2$ can be set to be a small angle.

The amount of light from the first light emitter is configured to be larger than the amount of light from the second light emitter. By this configuration, a large amount of regular reflection light enters into the sensor for photoelectric conversion so that a saturation of the sensor for photoelectric conversion can be prevented.

The first and the second light emitters are configured of light emitting diodes and light guiding bodies for deflecting light from the light emitting diodes into linear light.

The mirror reflecting surface and the translucent surface are formed on a first reflecting member, among the plurality of the reflecting members configuring the reflecting mirror, for reflecting, at first, the reflected light from the reading surface, and the second light emitter is arranged at the back surface of the first reflecting member. Since light passes through the first reflecting member and irradiates in the main scanning direction, the length of the irradiating light can be formed to be relatively short.

In addition, to solve the above-mentioned problems, according to a second aspect of the present invention, the apparatus comprises a platen having a reading surface; a light source for irradiating light on the reading surface; a reflecting mirror for reflecting light reflected from the reading surface to a predetermined light path direction; a condenser lens for condensing light from the reflecting mirror; and a sensor for subjecting light from the condenser lens into photoelectric conversion. The light source is configured of a first light emitter for mainly irradiating the diffuse reflection light on the original document, and a second light emitter for mainly irradiating the regular reflection light on the original document; the reflecting mirror is comprised of a plurality of reflecting member for reflecting light from the reading surface to a predetermined reading light path direction; and the reflecting mirror comprises a first reflecting member for reflecting, at first, the reflected light from the reading surface and a second reflecting member for reflecting light from the first reflecting member to a predetermined reading path direction. One of the reflecting members is arranged to be inclined at a predetermined angle with respect to the platen, and is configured of a flat-shaped translucent substrate; a mirror reflecting surface for specularly reflecting light and a translucent surface transmissive for light are formed on a part of the surface of the reflecting member; the mirror reflecting surface and the translucent surface are formed on the second reflecting member; the first light emitter is arranged between the platen and the first reflecting member; and the second light emitter is arranged at the back surface side of said reflecting member in such a way that light passes through the translucent surface of the second reflecting member and irradiates said reading surface. By forming the mirror reflecting surface and the translucent surface on the second reflecting member, and by arranging the second light emitter at the back surface side of the mirror reflecting surface, the distance between the light source and the surface of the original document can be made large so that the irradiating angle can be made smaller.

With respect to the reflecting member having the mirror reflecting surface and the translucent surface, the translucent surface is formed at a position near the reading surface, and the mirror reflecting surface is formed at a position far from the reading surface.

An end surface adjacent to the translucent surface of the reflecting member is chamfered to be nearly parallel to the reading surface. By this means, since the irradiating surface and the original document surface are directly opposite, the irradiated light is not scattered unsteadily at the edge of the reflecting member.

On a back surface of the reflecting member, a reflecting surface for reflecting light to a position opposite to the mirror reflecting surface formed on the front surface side is formed; and the reflecting surface is formed in such a way that light irradiated from the second light emitter and reflected by the mirror reflecting surface is reflected to direct to the reading surface. By this means, even when the light source has brightness change in the reading line direction, it is diffused to be uniformalized.

Further, to solve the above-mentioned problems, according to a third aspect of the present invention, the apparatus comprises a platen having a reading surface; a light source for irradiating light on the reading surface; a reflecting mirror for reflecting light reflected from the reading surface to a predetermined light path direction; a condenser lens for condensing light from the reflecting mirror; and a sensor for subjecting light from the condenser lens into photoelectric conversion. The light source is configured of a first light emitter and a second light emitter for irradiating light from at least two directions of different angles on the original document, and the reflecting mirror is configured of a plurality of reflecting members for reflecting light from the reading surface to a predetermined reading path direction. One of the reflecting members is arranged to be inclined at a predetermined angle with respect to the platen, and is configured of a flat-shaped translucent substrate; a mirror reflecting surface for specularly reflecting light and a translucent surface are formed on a part of the surface of the reflecting member; the first light emitter is arranged between the platen and the side of the mirror reflecting surface of the reflecting member; and the second light emitter is arranged at the back surface side of the mirror reflecting surface of the reflecting member in such a way that light passes through the translucent surface of the reflecting member to irradiate the reading surface. With respect to the reflecting member having the mirror reflecting surface and the translucent surface, the mirror reflecting surface is formed nearly at the central portion of the reflecting member, and the translucent surface is formed nearly at the both ends of the reflecting member; and the second light emitter is arranged in such a way that light from the translucent surface formed at the both ends is irradiated to the reading surface. By this means, since light from the second light emitter is irradiated to the reading surface from the two directions, the reflected light can be reliably read even when the inclination of the reflected light from the reading surface is deflected to the opposite direction.

At the back surface side of the reflecting member, a reflector for reflecting light from the second light emitter to the reading surface is arranged; and the reflector has a deflection characteristic to focus light from the second light emitter to the reading surface. By this configuration, the irradiating angle $\theta 2$ of the center of the linear light from the second light emitter can be easily adjusted by adjusting the position of the reflector. Further, since the irradiation is performed in two directions, the reflected light can be directly read even when the inclination of the light axis turns to the opposite direction.

At the back surface side of the reflecting member, a reflector for reflecting light from the second light emitter to a predetermined direction is arranged; and the reflector has a deflection characteristic to focus light from the second light emitter to the reading surface.

In addition, to solve the above-mentioned problems, according to a fourth aspect of the present invention, the apparatus comprises a light source for irradiating light on the reading surface; a reflecting mirror for reflecting light reflected from the reading surface to a predetermined light path direction; a condenser lens for condensing light from the reflecting mirror; and a sensor for subjecting light from the condenser lens into photoelectric conversion. The light source is configured of a first light emitter and a second light emitter for irradiating light to the reading surface from at least two directions of different angles; and the reflecting mirror is configured of a plurality of reflecting members for reflecting light from the reading surface to a predetermined reading path direction. One of the reflecting members is arranged to be inclined at a predetermined angle with respect to the platen, and is configured of a flat-shaped translucent substrate; a mirror reflecting surface for specularly reflecting light and a translucent surface are formed on a part of the surface of the reflecting member; the first light emitter is arranged between the platen and the side of the mirror reflecting surface of the reflecting member; and the second light emitter is arranged at the back surface side of the mirror reflecting surface of the reflecting member. At the back surface side of the reflecting member, a reflector for reflecting light from the second light emitter to the reading surface is arranged; and the reflector has a deflection characteristic to focus light from the second light emitter to the reading surface. The reflector has a first reflecting surface for irradiating light from one of the translucent surfaces formed on both sides of the mirror reflecting surface to the reading surface, and a second reflecting surface for irradiating light from the other of the translucent surfaces to the reading surface.

The reflector branches and projects light from the second light emitter from the first reflecting surface to one of the translucent surface, and from the second reflecting surface to the other of the translucent surface.

The first reflecting surface and second reflecting surface branch light from the second light emitter in such a way that the amounts of light respectively projected to the translucent surface are nearly the same.

The first reflecting surface and second reflecting surface branch light from the second light emitter in such a way that, on the reflecting member, the amount of light projected on the mirror reflecting surface at the central portion is smaller, and the amount of light projected on the translucent surface at the both ends is larger.

The first reflecting surface and second reflecting surface are formed to have curved shapes for focusing light from the second light emitter to project on the translucent surface.

The first reflecting surface and second reflecting surface form surfaces having different central points.

The mirror reflecting surface of the reflecting member is formed to totally reflect and block out light from the second light emitter.

The second light emitter is configured of a first and a second light emitting portions for respectively emitting linear light; and the first light emitter is arranged to project light on the first reflecting surface, and the second light emitter is arranged to project light on the second reflecting surface.

Effects of the Invention

According to the present invention, since the light source for irradiating linear light on the reading surface from two directions of different angles is configured of the first light emitter and the second light emitter; the first light emitter is arranged between the platen and the platen side of the reflecting member; the second light emitter is arranged at the back surface side of the flat-shaped reflecting member for reflecting light from the reading surface to the predetermined reading light path direction; and the mirror reflecting surface for specularly reflecting light and the translucent surface transmissive for light are formed on the surface of the reflecting member, and therefore, the following effects are obtained.

By the configuration in which the first light emitter is arranged between the platen and the reflecting member, and the second light emitter irradiates light on the reading surface by passing through the translucent surface, the apparatus in the height direction can be downsized. In addition, by configuring the second light emitter in such a way that light is irradiated from the back surface side of the reflecting member to the reading surface, the size of the light source portion in the vertical scanning direction can be downsized, resulting in that the apparatus as a whole can be miniaturized.

Light from the second light emitter passes from the back surface of the reflecting mirror through the translucent surface to irradiate the reading surface; and with respect to the reflected light from the reading surface, light is specularly reflected by the mirror reflecting surface to the predetermined light path direction. In a part of the reflecting member which is configured of a transparent member such as glass or the like, a mirror reflecting surface (evaporated surface) for specularly reflecting light is formed. Due to this, even when the mirror reflecting surface is formed to be miniaturized (to have a small area), the reflecting member itself has no risk to be deformed due to an impact shock or heat. In addition, even when light from the light source shines on component parts in the apparatus so that light is irregularly reflected, the irregularly reflected light can be prevented from entering into the reading light path by the back surface of the mirror reflecting surface.

Along with this, since the mirror reflecting surface of the reflecting member can be miniaturized to an ultimate area for reflecting light to the predetermined direction, the light path of the second light emitter for irradiating light from the back surface side to the reading surface can be arranged at a position close to the reflected light path from the reading surface to the mirror reflecting surface. Accordingly, nearly regular reflection light of light irradiated from the second light emitter to the reading surface can be introduced into the reading light path so that a gloss image can be precisely read.

Further, since light is projected to the reading surface from the two directions of the first reflecting surface and the second reflecting surface; and the first and the second reflecting surfaces project light from both sides of the mirror reflecting surfaces of the mirror substrate, reflected light of light of either one of the two direction is guided to the mirror reflecting surface even when the surface of the original document image is a concave-convex surface. Therefore, when for example the original document image is a gloss image with a high gloss level, it becomes possible to guide reflected light nearly equal to the regular reflection light to the mirror reflecting surface.

Accordingly, while sandwiching the mirror reflecting surface, light is projected from the two directions close to it, and therefore the amount of light of the light source can be efficiently directed to the reading surface. Due to this, it is possible to reduce the consumed power, amount of heat generation, and the like.

Further, according to the present invention, since it is configured in such a way that, on the mirror substrate for deflecting the reflected light form the reading surface to the reading light path direction, the mirror reflecting surface is provided on its central portion, and the translucent portions are provided on its both end portions, so as to project light from the translucent portions at the both end portions, it is possible to miniaturize the area when for example the mirror reflecting surface is configured of a mirror coating, thereby it is not necessary to miniaturize the mirror substrate so that the reflecting member itself has no risk to be deformed due to an impact shock or heat. Along with this, since light from the light source can be projected from a position close to the mirror reflecting surface, nearly regular reflection light of light can be introduced into the reading light path, so that a gloss image can be precisely read.

Further, according to the present invention, the first reflecting surface and second reflecting surface are formed to have curved shapes for focusing light from the light source, whereby the amount of light projected on the mirror reflecting surface of the mirror substrate can be reduced. By employing this configuration, it becomes possible to prevent light projected from the light source arranged at the back surface side of the mirror substrate from being irregularly reflected by the mirror reflecting surface and from entering into the reading light path.

Still further, it is possible to branch light from the single light source to the first reflecting surface and the second reflecting surface by simply shaping the two reflecting surfaces. As such, it is possible to adjust the projected light of the two directions to have the uniform amount of light in accordance with the shapes of the reflecting surfaces.

Still further, according to the present invention, regular reflection reading light is irradiated from the first and the second reflecting surfaces, and, aside from this, a light source means is provided for irradiating diffuse reflection reading light to the reading surface, whereby it becomes possible to read original document images such as gloss images having different gloss levels.

BRIEF DESCRIPTION OF THE DRAWINGS

FIG. 12 shows the structure of the light source according to the present invention, wherein (a) snows the entire configuration, and (b) shows an arrangement construction of the light emitter.

MODE FOR EMBODYING THE INVENTION

First Embodiment

Figure 1:
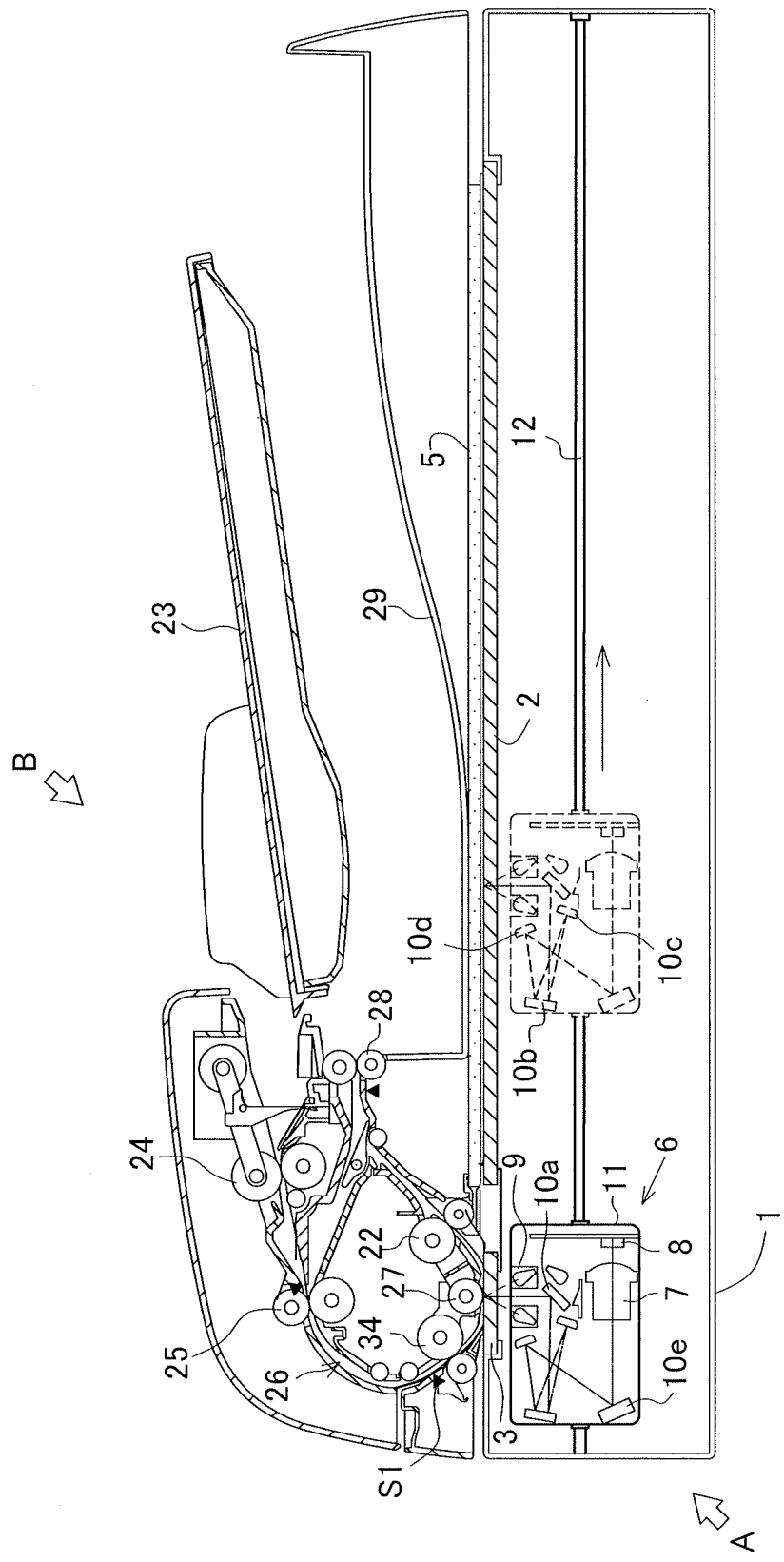
FIG. 1 is an explanatory view of the entire configuration of an image reading apparatus according to the present invention.

In the following, the present invention will be described in detail with reference to a preferred embodiment shown in the drawings. FIG. 1 shows an image reading apparatus having a light source structure according to the present invention. This apparatus includes an image reading apparatus A and an original document feeding apparatus B mounted on it. In the following, the image reading apparatus A and the original document feeding apparatus B will be sequentially explained.

[Image Reading Apparatus]

The image reading apparatus A according to the present invention is comprised of, as shown in FIG. 1, a first platen 2 and a second platen 3 in a apparatus housing 1. The first and the second platens 2 and 3 are formed of transparent material and are fixed at the upper portion of the apparatus housing 1. The first platen 2 is formed to have a size adapted to mount and set one or more original documents. The second platen 3 is formed to have a size of its width adapted to read an original document travelling at a predetermined speed. The second platen 3 is equipped with the later described original document feeding apparatus B. The above-mentioned first and second platens 2 and 3 are arranged side-by side each other as shown in FIG. 1. An image reading mechanism is mounted in the apparatus housing 1.

The image reading mechanism will be explained with reference to FIG. 2 (expanded figure of a main portion of FIG. 1). In the apparatus housing 1, an optical carriage (hereinafter simply referred to "carriage") 6 is arranged and configured to be able to reciprocate along the first platen 2 as well as to be movable in position between the first platen 2 and the second platen 3. The carriage 6 includes a unit frame 11, made of heat tight resign or the like, that is supported by bearing by guide rails 12. Here, in order to prevent random reflection of light in the carriage 6, black pigment such as carbon is mixed into the resign material of the unit frame 11 so that the color of the unit frame 11 is black.

In the unit frame 11 of the carriage 6, there are mounted light source 9 (a first light source 9a and a second light source 9b as later described), reflecting mirrors 10 (a first mirror 10a, a second mirror 10b, a third mirror 10c, a fourth mirror 10d, and a fifth mirror 10e) for deflecting light reflected from the original document, a condenser lens 7 for focusing light from the reflecting mirror 10e, and a line sensor 8 arranged at a focused portion on which an image is focused by the condenser lens 7. The line sensor 8 is electrically connected to an image processing portion (a data processing board; not shown in the drawings) via a data transfer cable so as to transfer an image data output from the line sensor 8 as an electric signal to the image processing portion.

[Configuration of the Carriage]

The above-mentioned carriage 6 is received by a bearing by the guide rails 12 arranged on the unit frame and is supported so as to reciprocate along the guide rail 12. The carriage 6 is connected to a carriage motor (not shown in the drawings) through a winding up member such as a wire, and is reciprocated in the left or right direction in FIG. 2 by a non-reverse or reverse rotation of the motor. The above-mentioned guide rails 12 are configured of a pair of right and left ones arranged in parallel with the first platen 2 so as to reciprocate the carriage 6.

Figure 2:
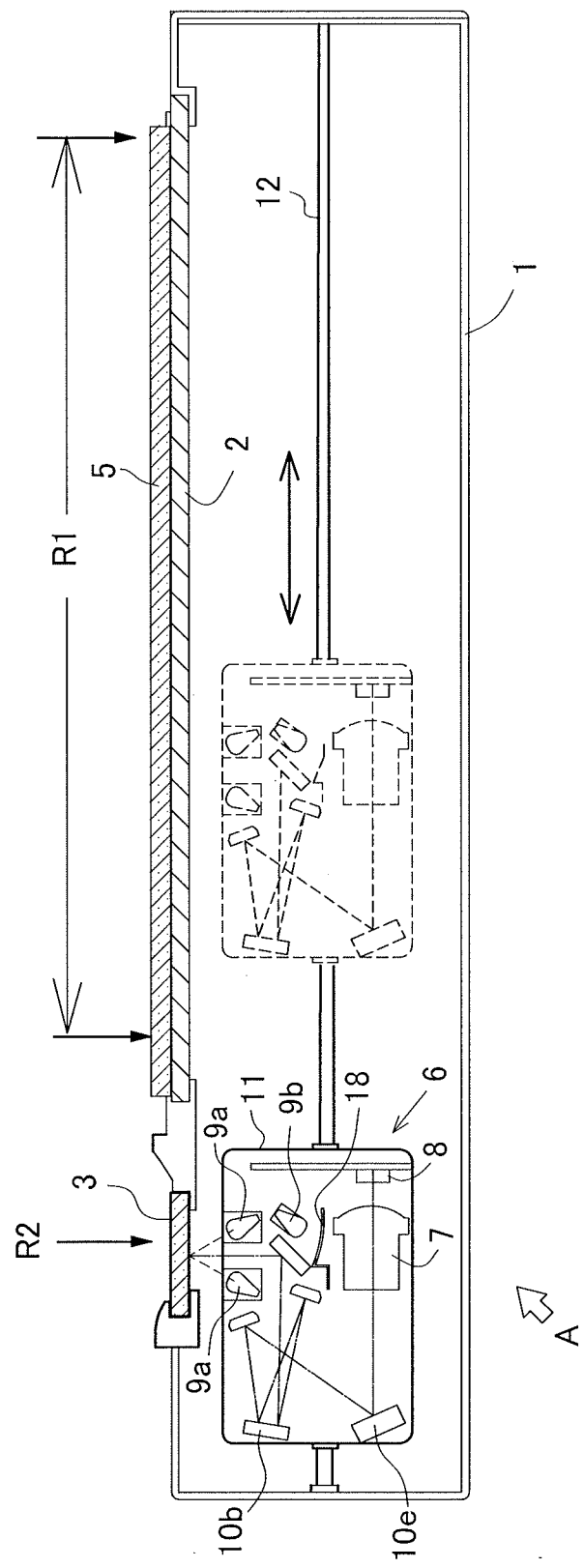
FIG. 2 is an explanatory view of the configuration of a carriage for reading an original document image in the apparatus shown in FIG. 1.

As shown in FIG. 2, the first platen 2 and the second platen 3 are arranged on a nearly same flat surface. The carriage 6 positioned below them is supported by the guide rails 12 so as to flexibly move its position directly below the first platen 2 and the second platen 3 in such a way that its position is selectively moved between the first platen 2 and the second platen 3 by the not-shown carriage motor. While the carriage 6 is moving along the first platen 2, an original document set on the first platen 2 is scanned and the line sensor 8 reads the image in accordance with a line sequence. Then, the carriage 6 is configured in such a way that it is moved from the first platen 2 to a position directly below the second platen 3, and in the state where ii is stopped at that position, the carriage 6 reads the image on an original document moving on the second platen at a predetermined speed in accordance with a line sequence.

In the above-mentioned carriage 6, the later described light source 9, and the reflecting mirrors 10 for deflecting reflected light of light irradiated from the light sources 10 are mounted. In the apparatus shown in FIG. 2, the reflected light from the reading surface R is deflected by the first mirror 10*a*, and light is guided to the second mirror 10*b* and the third mirror 10*c*. A light path from the third mirror 10*c* through the second mirror 10*b*, the fourth mirror 10*d*, and the fifth mirror 10*e* is formed in this sequence. Then light from the fifth mirror 10*e* is focused by the condenser lens 7 to form an image on the line sensor 8.

The above-mentioned condenser lens 7 is configured of a single or a plurality of lenses to form a convex lens as a whole. The line sensor 8 is configured of a photoelectric conversion element such as a CCD, and the shown one is configured of a RGB color sensor array. Note that, in the present invention, the condenser lens 7 and the line sensor 8 are mounted in the carriage 6 as an example, however, they may be arranged, for example, on the bottom of the chassis. In another embodiment, the carriage 6 may be configured of a first and a second two carriages, the first carriage mounting the light sources and the reflecting mirrors, and the second carriage mounting the condenser lens and the line sensor.

[Configuration of the Light Sources]

In the above-mentioned carriage 6, the light source 9 for irradiating linear light on the reading surface R is mounted. The light sources according to the present invention irradiate light on the reading surface R from two different angle directions. The light source mechanism in the apparatus shown in FIG. 1 is shown in FIG. 3(*a*) and (*b*). First radiation emitters 20 are provided so that linear light Hp1 is entered from the first light source 9*a* at an angle $\theta 1$ as shown, and linear light Hp2 is entered from the second light source 9*b* at an angle $\theta 2$ as shown.

The illustrated angles $\theta 1$ and $\theta 2$ show the angles with respect to a normal line from the platen surface. A read optical path (A reflected light derived from the reading surface R; the same in the following) Hr is formed in the normal direction.

Note that, in the illustrated apparatus, the first light sources 9*a* are configured of a pair of light emitters. This is because of ensuring a radiated light amount on the reading surface R. However, it is not always necessary to construct the first light sources 9*a* by a pair of light emitters but may be configured of, for example, a single fluorescent lamp or a single light emitter (such as an LED).

Here, the angle $\theta 1$ between each of the first light sources 9*a* and the read optical path Hr, and the angle $\theta 2$ between the second light source 9*b* and the read optical path Hr are set as follows. The angle $\theta 1$ is set in a direction inclined from the reading surface R so that diffusion light from the first light sources 9*a* form the read optical path Hr. Accordingly, $\theta 1$ is set in accordance with a layout structure such as a fixing space of the first light sources 9*a* (in the illustrated example, a pair of right and left ones).

That is, the first a are positioned near the reading surface R, and the incident angle $\theta 1$ is determined in accordance with an arranging space of the lamps of the light sources or the like. Then, diffusion light from the first light sources 9*a* is irradiated on the reading surface R and a reflected light (read light) from a concavity and convexity (surface roughness) on the original document is entered on the reflective mirror (first mirror) 10*a* arranged in the direction normal to the reading surface R.

The angle $\theta 2$ of the second light source 9*b* (later described second light emitter 21) is set in accordance with the surface roughness of the gloss original document. When the surface is a completely smooth surface, it is necessary to set c=0, however, the completely smooth surface is not present. The inventors of the present invention made experiments with respect to gloss original documents which are most similar to the completely smooth surface, and found that it is preferable to set it within 3 degrees in the apparatus shown in FIG. 1.

According to such settings, usually, the angle $\theta 1$ becomes larger than the angle $\theta 2$ ($\theta 1 > \theta 2$), and the allowable maximum angle of the angle $\theta 2$ is determined in accordance with the degrees of luster of the read original document (within 3 degrees in the apparatus shown in FIG. 1), and if it exceeds the value, a phenomena where dark portions are not shown occurs. FIGS. 3(*a*) and (*b*) show the layout structure of the second light source 9*b* (21).

The first light sources 9*a* (20) are arranged in the unit frame 11, at positions near the reading surface R of the first and the second platens 2 and 3, in such a way that diffusion light from one of the right and the left or both of the right and the left is irradiated in the direction declined by the angle $\theta 1$. On the other hand, the second light source 9*b* is arranged near the back surface of the first mirror 10 for reflecting the reflected light (reading path Hr) in a predetermined direction from the reading surface R. The mode (first embodiment) shown in FIG. 3 is configured to irradiate the linear light Hp2 from the second light source 9*b* on the reading surface R. It is arranged that the linear light Hp2 is entered on the reading surface R with the previously mentioned angle $\theta 2$.

Substantially diffusion light of the reflected light (almost all of the components are diffusion light) from the first light sources 9*a* is photo-electrically converted, and substantially regularly reflected light from the second light source 9*b* is photo-electrically converted. Therefore, the output values from the first light sources through the photoelectric sensor 8 are referred to as diffusion reflected output values, and the output values from the second light sources 9*b* are referred to as regular reflected output values.

[Configuration of the Reflecting Mirror]

As described previously, the carriage 6 is configured of reflecting mirrors 10 including a plurality of reflecting members (in the illustrated ones, the first mirror 10a-the fifth mirror 10e), each of which is fixed to the unit frame 11. The reflecting member (the first mirror; as the case may be) 10a arranged near the back surface of the second light source 9b is configured in such a way that a part of it transmits the linear light Hp2 from the second light sources 9a, and another part makes specular reflection of the read light Hr from the reading surface R.

The reflecting member 10a is a plate-shaped board made of translucent material such as transparent plastics. On its surface, a mirror reflecting surface 10x for specular reflection of light and a translucent surface transmissive for light 10y are formed. That is, the mirror reflecting surface 10x is provided by forming a metal film such as aluminum by vacuum deposition on a part of the surface of the translucent board (base material) made of glass or the like. On its surface, a translucent surface 10y which is not coated by a metal film.

Figure 3A:
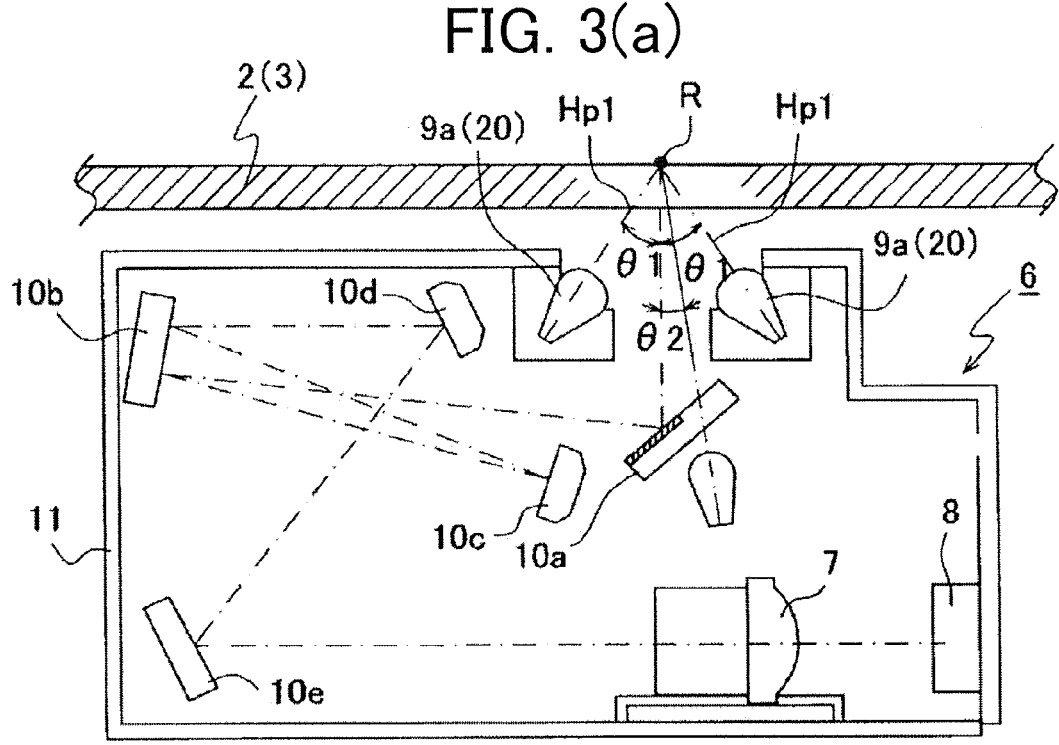
FIG. 3 shows a light source mechanism in the apparatus shown in FIG. 2, wherein (a) shows a layout configuration of the light source, and (b) shows an expanded diagram of the main portion of (a).
Figure 3B:
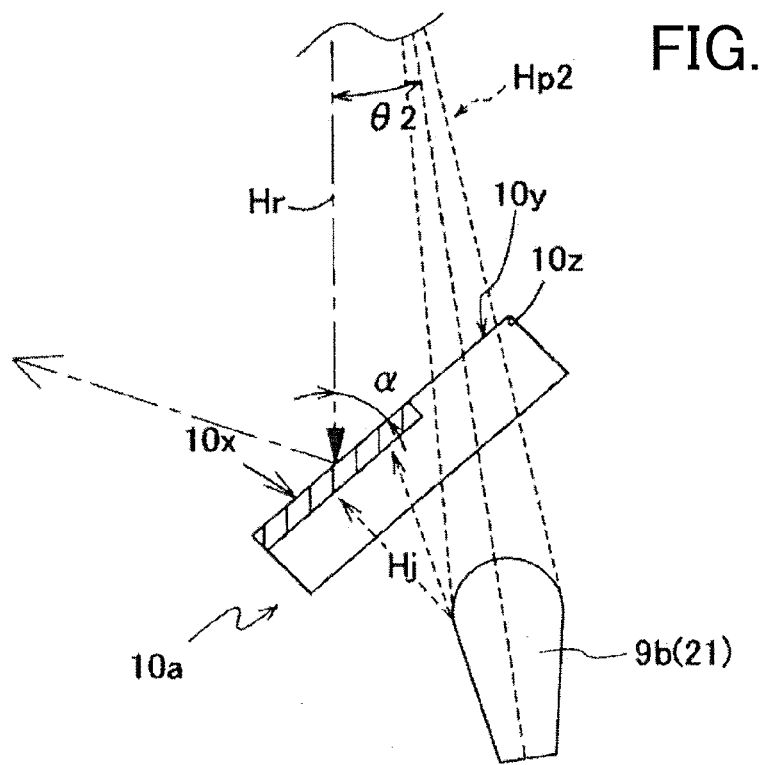

In the embodiment shown in FIG. 3, the first reflecting member 10a for reflecting at first the reflected light (reading light path Hr) from the reading surface R is provided with the mirror reflecting surface 10x and the translucent surface 10y. The reflecting member 10a is arranged to be inclined with a predetermined angle (an angle α shown in FIG. 3(b)) with respect to the reading path Hr (the normal direction to the reading surface R). In this state, the mirror reflecting surface 10x is arranged at a lower portion (a position far from the reading surface R) and the translucent surface 10y is arranged at an upper portion (a position near the reading surface R).

It is arranged that light from the second light source 9b transmits the translucent surface 10y between an end surface 10z (see FIG. 3(b)) of the reflecting member 10a and the mirror reflecting surface 10x formed at the lower portion. As such, by forming the mirror reflecting surface 10z at the lower portion of the reflecting member 10 which is declined by the predetermined angle (α), and by forming the translucent surface 10y at the upper portion, scattered light from the second light source 9b (shown by Hj in FIG. 3(b)) do not enter the reading path Hr so that no flare phenomenon occurs. Accordingly, the mirror reflecting surface 10x prevents the scattered light from the second light source 9b from directly entering into the line sensor 8.

Further, it is configured that light from the second light source 9b pass through a portion between the end surface 10z of the reflecting member 10a and the mirror reflecting surface 10x. This is because, when light from the second light source 8b is irradiated on the end surface 10z, scattered light is generated at this portion, and it is necessary to prevent light from entering into the reading path Hr.

Next, a modified embodiment of the first embodiment will be explained with reference to FIG. 4 and FIG. 5.

Second Embodiment

Figure 4A:
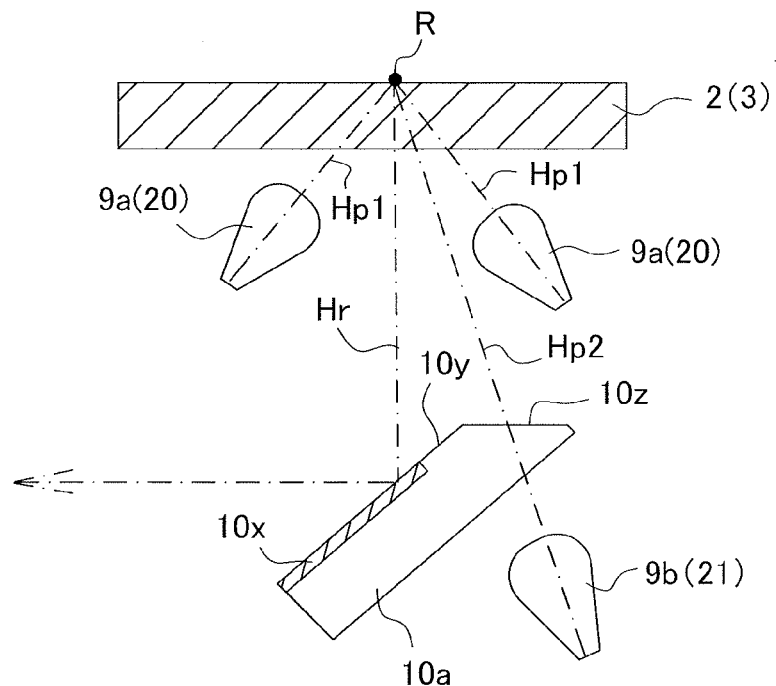
FIG. 4 shows a configuration diagram of a light source mechanism different from FIG. 3, wherein (a) shows a case in which the first reflecting surface is chamfered, and (b) shows a case in which a reflecting sheet is provided on the first reflecting member.

FIG. 4(a) shows an improvement of the structure of the end surface of the above-described first reflecting member 10a, in which a first reflecting member 10a includes a mirror reflecting surface 10x formed at a lower half portion and a translucent surface 10y formed at an upper half portion. When a light is irradiated from a second light source 9b (21) on an end surface 10z adjacent to this translucent surface 10y, there is a possibility in that irregular reflection occurs at the end surface so that light is directly entered into the reading path Hr. To prevent this, the end surface 10z of the first reflecting member 10a shown in FIG. 4(a) is chamfered to be generally parallel with the reading surface R (platen surface). By this, light irregularly reflected on the end surface 10z is not directly entered into the reading path Hr.

Third Embodiment

Figure 4B:
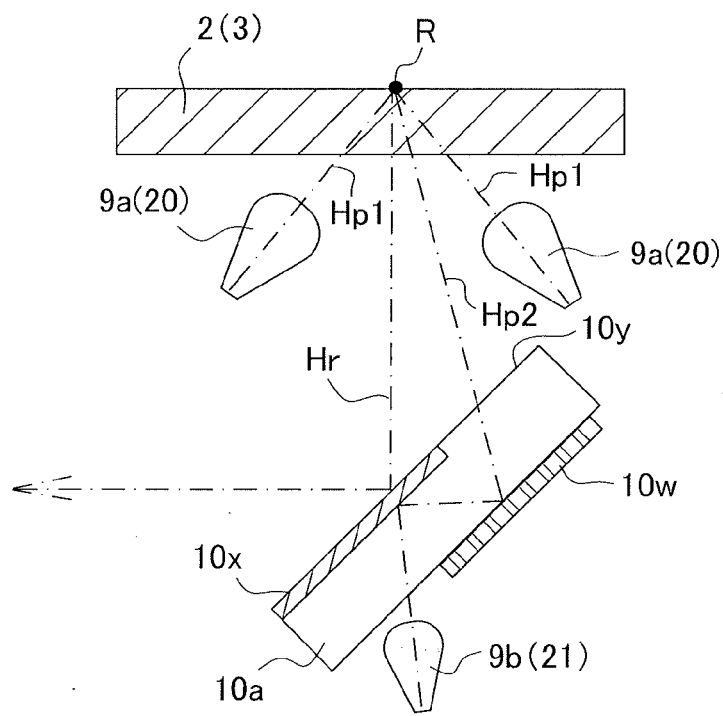

FIG. 4(b) shows an improvement of the structure of the reflecting surface of the above-described first reflecting member 10a, in which a first reflecting member 10a includes a mirror reflecting surface 10x formed at a lower half portion and a translucent surface 10y formed at an upper half portion. Here, a reflecting sheet 10w is attached on an upper half portion of the back surface of the first reflecting member 10x. This reflecting sheet 10w is provided with a reflecting surface formed to have, for example, a form of a Fresnel lens.

Then, it is configured that a light reflected from the mirror reflecting surface 10x formed at the lower half portion of the first reflecting member 10a is reflected by the reflecting surface and is irradiated from the translucent surface 10y to the reading surface R. A second light source 9b (21) is arranged in such a way that light from the second light source 9b (21) is irradiated on the back surface of the mirror reflecting surface 10x. The other constructions are the same as the first embodiment and the explanation thereof is omitted here while the same parts are denoted by the same symbols.

In the above-described third embodiment, a case has been shown in which the first reflecting member 10a includes the mirror reflecting surface 10x formed at the lower half portion and the translucent surface lay formed at the upper half portion. In this case, there is a possibility in that, if the degree of luster (smoothness) of the surface of the original document is further higher, there is a possibility in that an image cannot be read. Similarly, when the first reflecting member 10a is arranged at a position near the reading surface R, there is a possibility in that a light is irradiated from an angle larger than the above-mentioned 3 degrees.

Fourth Embodiment

Figure 5:
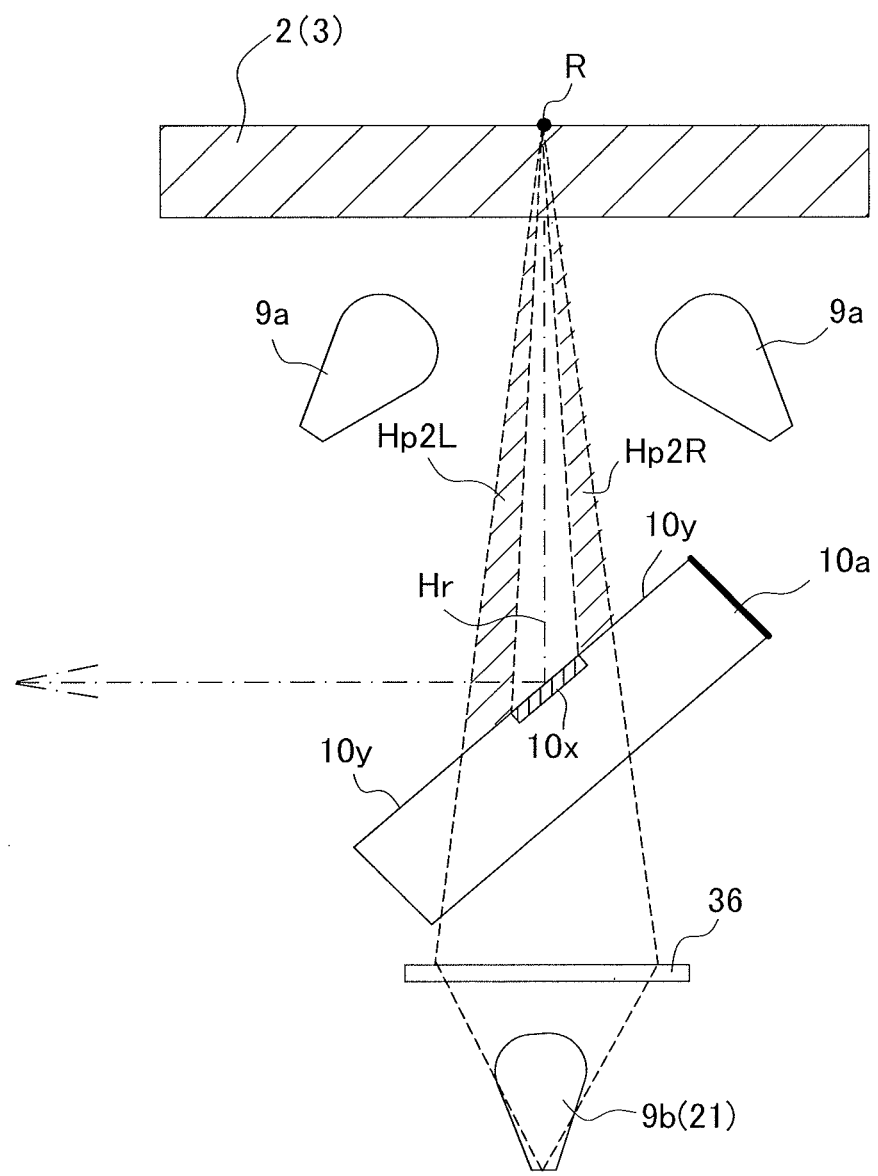
FIG. 5 is a configuration diagram of a light source mechanism which is different from FIG. 3 and FIG. 4.

Accordingly, FIG. 5 shows its improvement in which a mirror reflecting surface 10x is formed at nearly a center portion of a first reflecting member 10a, and translucent surfaces 10y are arranged at nearly the both end portions. Then, a second light source 9b (21) is configured in such a way that light is irradiated from the translucent surfaces 10y formed at the both end portions to the reading surface R.

BY this configuration, on the reading surface R, linear lights Hp2R and Hp2L are irradiated from left and right two directions without the irradiation from the back surface of the first reflecting 10a to the mirror reflecting surface 10x at the center. By this light irradiation from the left and right two directions, reflected light of diffusion light is introduced through the reading path Hr on the reading surface R. Note that illustrated FIG. 36 represents a diffusion plate for diffusing light from the second light source 9b (21).

Fifth Embodiment

Other Embodiment of the Second Light Source

In the above-described embodiment, a case has been shown in which the second light source 9b (21) is arranged at a back surface side of the first mirror (first reflecting member) 10a for deflecting, at first, the reflected light from the reading surface R. It is also possible to arrange the second light source 9b (21) at a back surface side of a second mirror (second reflecting member) 10b which is placed opposite to the first mirror 10a.

Figure 6:
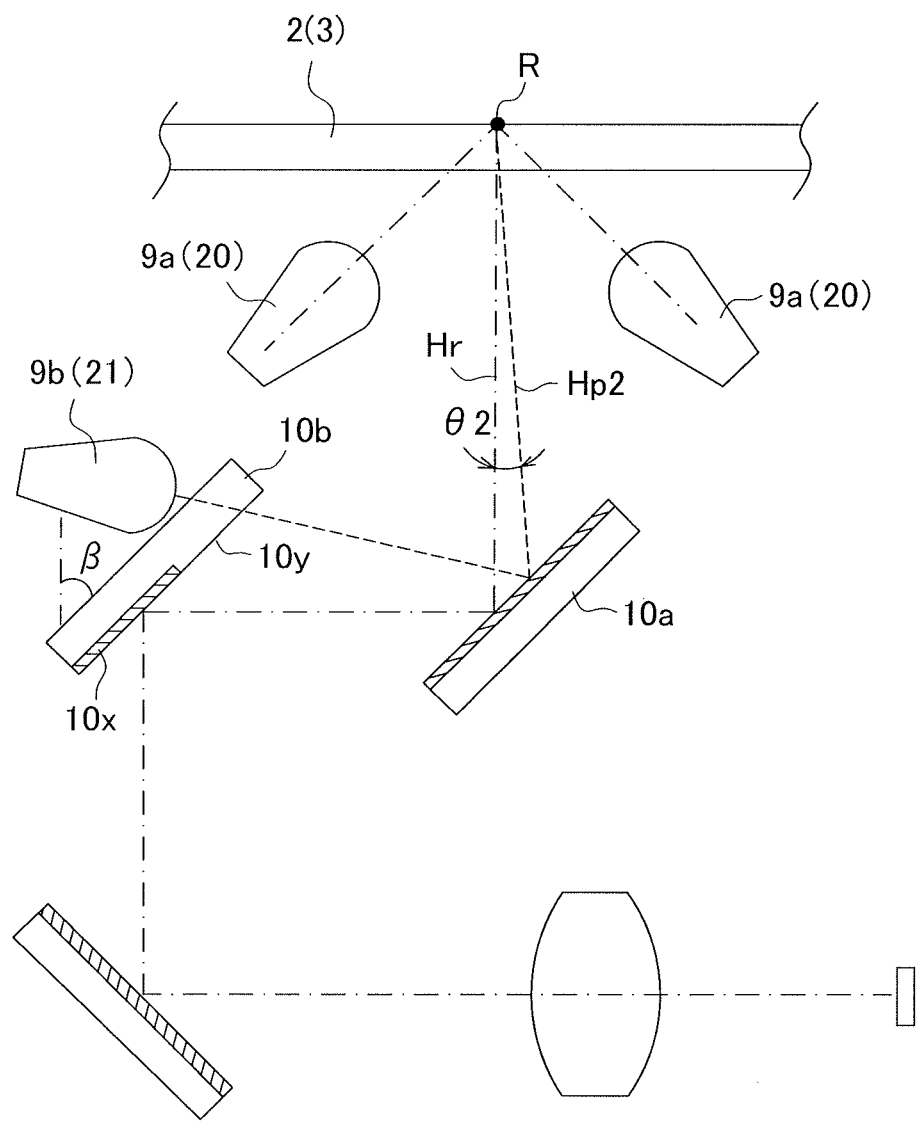
FIG. 6 is an explanatory view of the configuration in a case when a second light source is provided at a back surface side of the second reflecting member.

FIG. 6 shows a case where a second light source 9b is arranged at a back surface side of the second reflecting member 10b. The second reflecting member 10b is arranged at a position opposite to the first reflecting member 10a into which the reflected light from the reading surface R is at first entered, and it deflects light from the first reflecting member 10a to a predetermined reading path Hr. The second reflecting member 10b is a plate-shaped board made of translucent material such as transparent glass or transparent plastics. On its surface, a mirror reflecting surface 10x for specular reflection of light and a translucent surface transmissive for light 10y are formed. The mirror reflecting surface 10x is configured of a metal film such as aluminum by vacuum deposition on a part of the surface of the translucent board (base material) made of glass or the like.

This second reflecting member 10b is arranged to oppose to the first reflecting member 10a and to be declined by a predetermined angle (an angle β shown in FIG. 6) with respect to the reading surface R. In this state, a mirror reflecting surface 10x is arranged at a lower half portion (at a position far from the reading surface R), and a translucent surface 10y is arranged at an upper half portion (at a position near the reading surface R).

The second light source 9b (21) is arranged at a back surface side of this translucent surface 10y, and it is configured that light passes through the translucent surface 10y to be entered to the first reflecting member 10a. The linear light Hp2 entered the first reflecting member 10a is irradiated on the reading surface R. By configuring as such, is becomes possible to set the incident angle θ2 of the linear light Hp2 irradiated on the reading surface R from the second light source 9b (21) to be within a predetermined angle (for example, within 3 degrees).

In the above-described first, second and third embodiments of the second light source 9b and the reflecting members 10a, a case has been shown where light from the second light source 9b transmits across the reflecting member 10a to irradiate the reading surface R, however, it may also be possible to arrange a reflector 18 and light focused by the reflector 18 may be irradiated on the reading surface R.

Sixth Embodiment

Figure 7A:
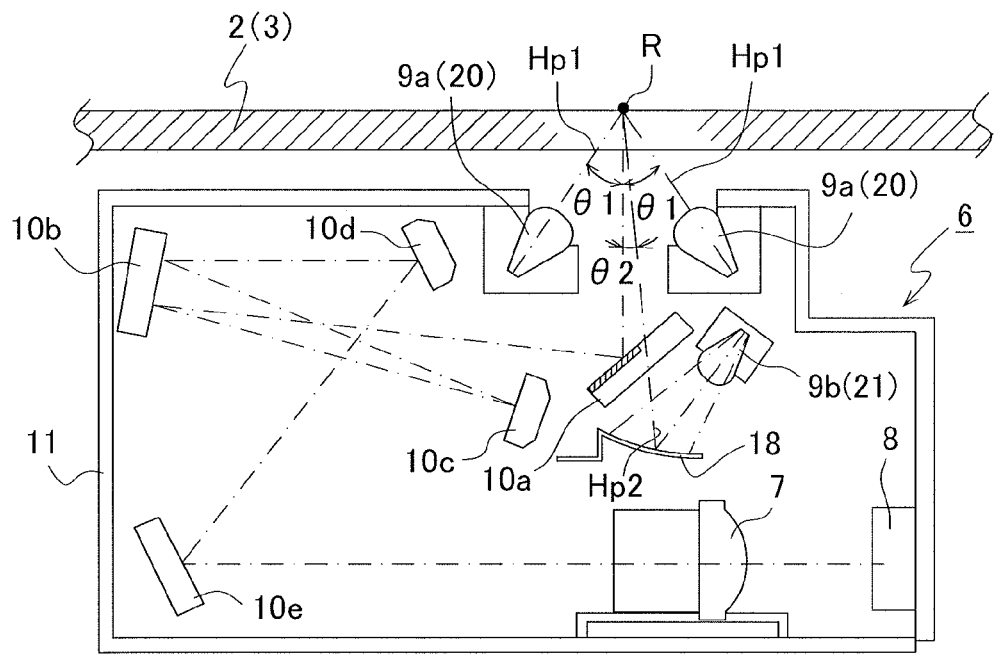
FIG. 7 shows a configuration of a light source means an a carriage structure (sixth embodiment) which is different from FIG. 3-FIG. 6, wherein (a) shows a layout configuration of the light source means for irradiating the platen, and (b) shown a structure of a reflector.

A modified example of this mode is shown in FIG. 7. Except for the reflector 18, the other construction is the same as the third embodiment of FIG. 3, and therefore the same reference symbols are affixed and the explanation is omitted here. In FIG. 7, a case is shown where reflecting mirrors 10 are configured of a first reflecting member 10a, a second reflecting member 10b, and a third reflecting member 10c. Then, it is configured that light from the second light source 9b (later described second light emitter 21) is reflected by the reflector 18 and its linear light Hp2 is irradiated on the reading surface R. It is arranged that the linear light Hp2 is entered into the reading surface R with the above-mentioned incident angle θ2.

Figure 7B:
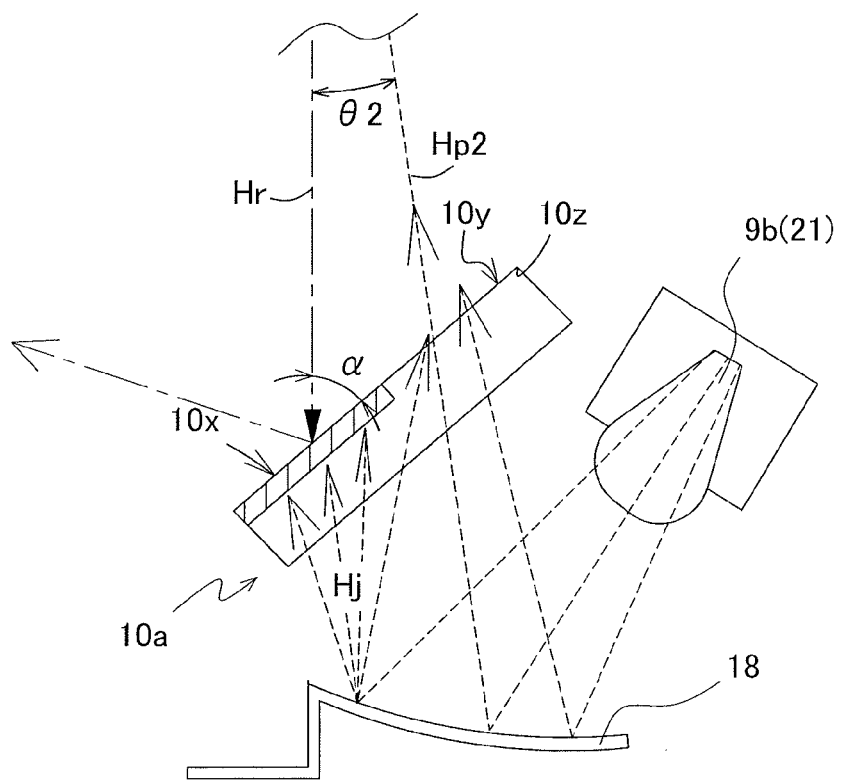

Then, it is configured that light from the second light source 9b transmits through a translucent surface 10y formed between an end surface 10z (see FIG. 7(b)) and a mirror reflecting surface 10x formed at a lower half portion. As such, by forming the mirror reflecting surface 10x at a lower half portion of the reflecting member 10a which is declined by a predetermined angle (α) and by forming the translucent surface 10y at an upper half portion, the scattered light (shown by Hj in FIG. 7(b)) from the second light source 9b do not enter into the read optical path Hr so that no flare phenomenon occurs. Accordingly, the scattered light from the second light source are prevented from directly entering onto the line sensor 8.

Seventh Embodiment

Figure 8A:
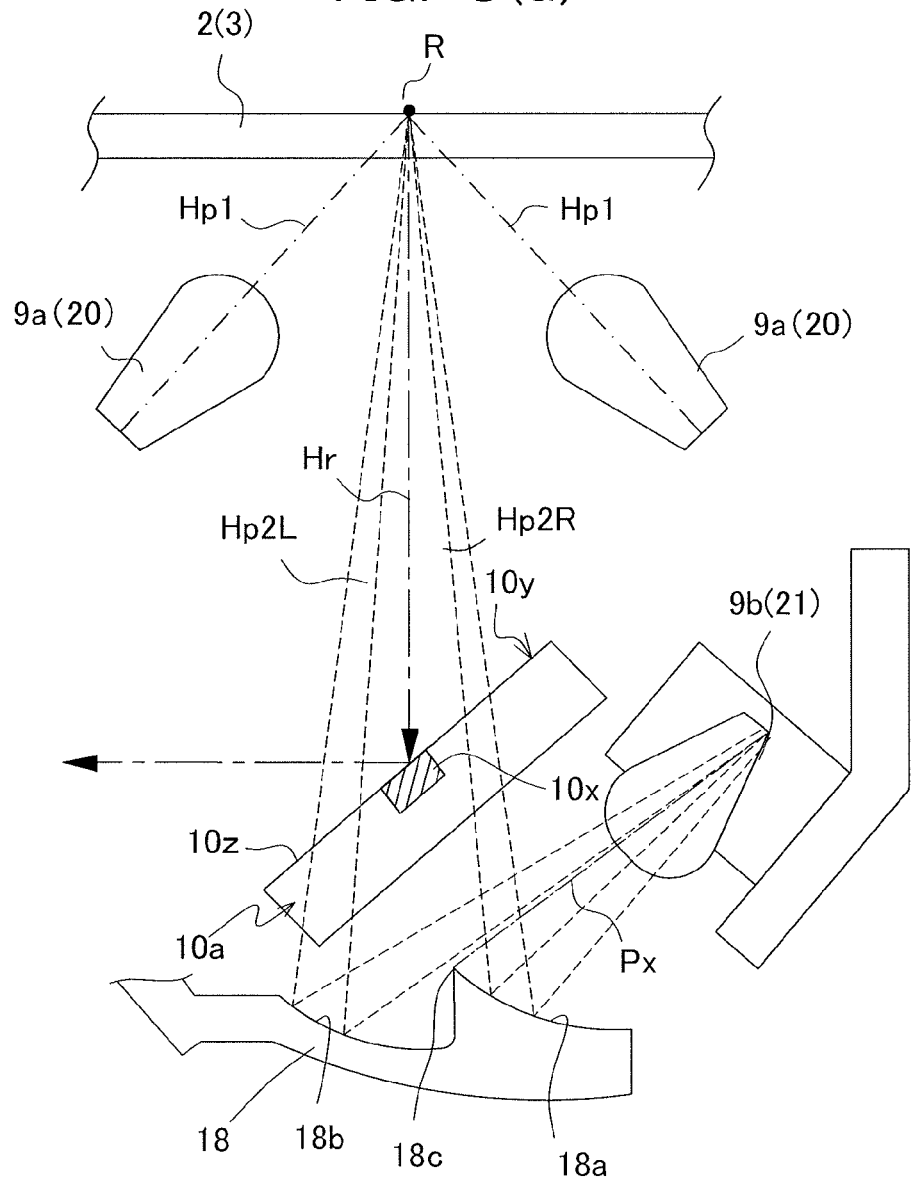
FIG. 8 shows a configuration of a light source means (seventh embodiment) which is different from FIG. 7, wherein (a) shows a layout configuration of the light source means for irradiating the platen, and (b) shown a structure of a reflector.

FIGS. 8(a) and (b) shows its modified example. Except for the reflector portion 18, the elements are the same as those in the above-described sixth embodiment, and therefore, the same reference symbols are affixed to the same portions and the explanation is omitted here.

In the embodiment shown in FIG. 8, a reflector portion 18 is configured of reflector member such as resign or metal. On the reflector member, a first reflecting surface 18a and a second reflecting surface 18b are provided. The first reflecting surface 18a transmits linear light from a light emitter 21 through one translucent surface 10y so as to irradiate as Hp2R onto a reading surface R. The second reflecting surface 18b transmits light through another translucent surface 10z so as to irradiate as Hp2L onto the reading surface R. Accordingly, light from the light emitter 21 is branched into two directions by the first and the second reflecting surfaces.

In this case, the positions of the light emitter 21 and the first and the second reflecting surfaces are set in such a way that the irradiated light amount from the first reflecting surface 18a through the translucent surface 10y to the reading surface R are nearly the same as the irradiated light amount from the second reflecting surface 18b through the translucent surface to the reading surface R. As shown in FIG. 8 (a), it is arranged that a center Px of the light source is positioned at a boundary line 18c between the first and the second reflecting surfaces 18a and 18b, the right half of the light emitter irradiating light on the first reflecting surface 18a, while the left half of the light emitter irradiating light on the second reflecting surface 18b. In addition, it is arranged that both of the light path lengths from the light emitter to the reading surface are nearly the same.

Further, the above-described first and the second reflecting surfaces are configured in such a way that, as shown in FIG. 8 (b), the amount of light from the light emitter 21 and irradiated on the back surface of the mirror reflecting surface 10x is made to be as small as possible, while the amount of light from irradiated on the translucent surfaces 10y and 10z at the both ends is made to be as large as possible. To this end, the projection angles of light from the first and the second reflecting surfaces are set. The angle α1 of the first reflecting surface is set in such a way that the light projection direction directs to the translucent surface 10y, while the angle α2 of the second reflecting surface is set in such a way that the light projection direction directs to the translucent surface 10z.

Figure 8B:
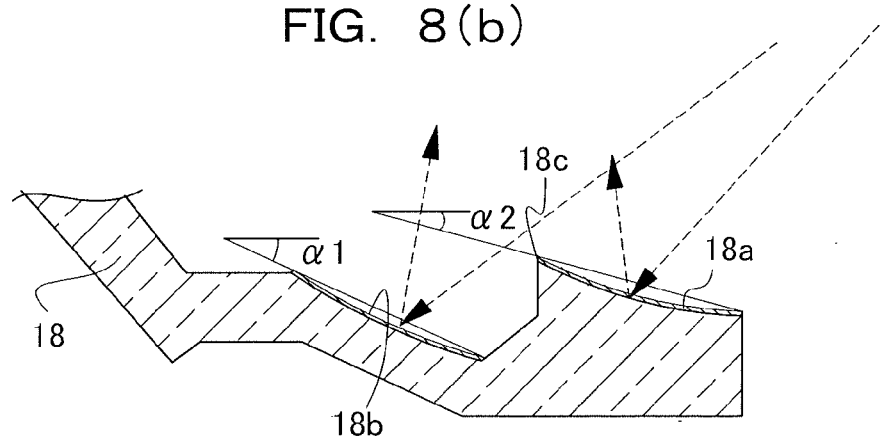

Along with the above, the first and the second reflecting surfaces are, as shown in FIG. 8(b), formed to have curved surfaces respectively so that light from the light source are focused to be directed to the translucent surfaces 10y and 10z.

As described above, the position relationships of the first and the second reflecting surfaces with respect to the light emitter and the areas of the reflecting surfaces are set in such a way that light from the light emitter 21 is divided homogeneously, and the angles (α1 and α2) of the respective reflecting surfaces are set in such a way that the respective reflected light is directed to the translucent surfaces 10y and 10z.

Further, the shown one has the first and the second reflecting surfaces with the curved forms so as to focus light on the translucent surfaces 10y and 10z. By such a configuration, light from the light source is not irradiated on the back surface of the mirror reflecting surface 10x of the reflecting member 10a.

Accordingly, the amount of light irradiated on the back surface of the mirror reflecting surface 10x and randomly reflected to enter the read optical path Hr is reduced.

Note that the first and the second reflecting surfaces shown in the drawing are configured of affixing a mirror film on the reflector 18 made of resign. By this, it is not necessary to perform direct evaporation on the reflector member so that its manufacture is easy and the manufacturing cost can be reduced.

Eighth Embodiment

Figure 9:
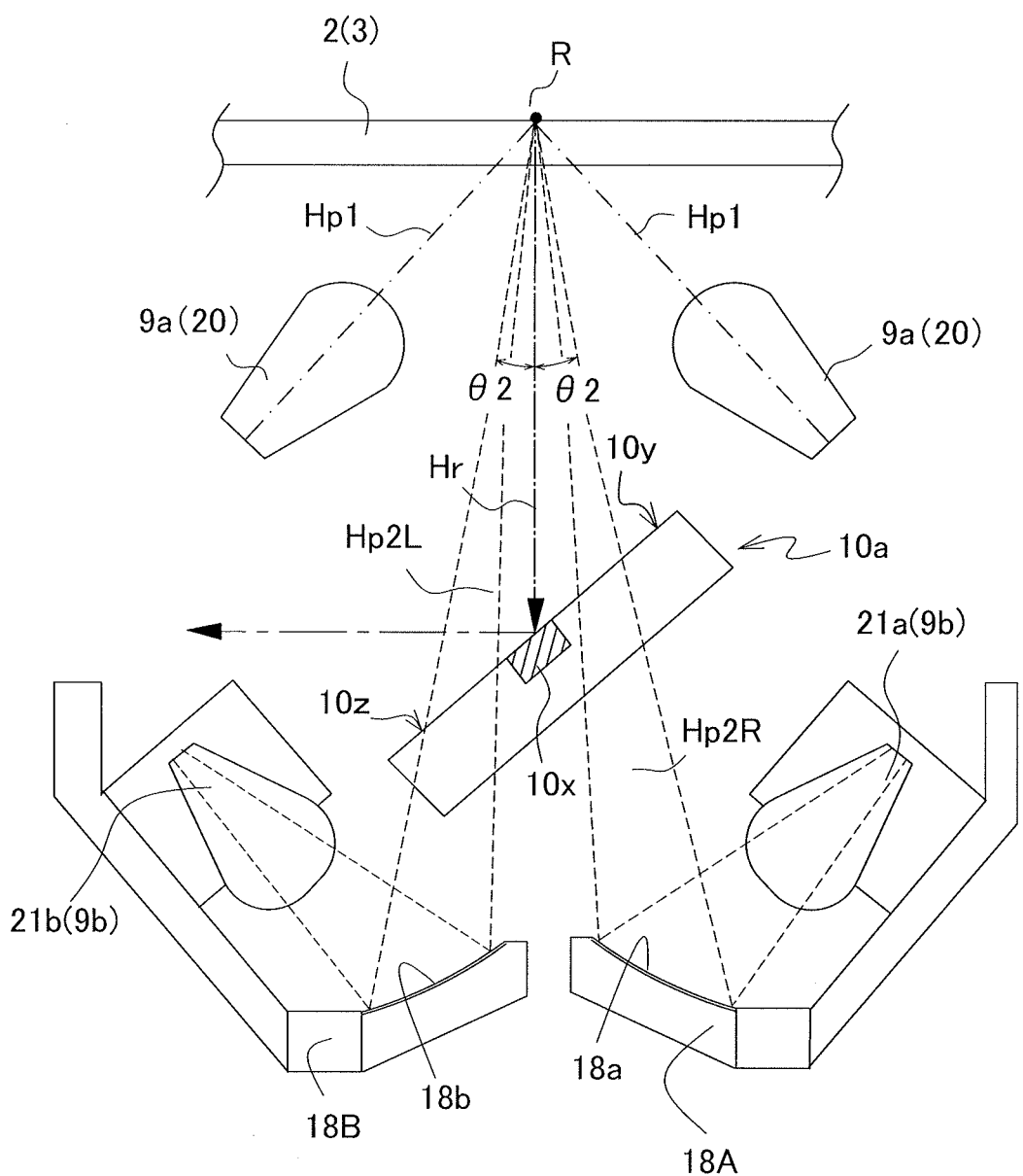
FIG. 9 shows a configuration of a light source means (eighth embodiment) which is different from FIG. 8.

FIG. 9 shows a case where a first reflecting surface 18a is arranged on a first reflector 18A, and a second reflecting surface 18b is arranged on a second reflector 18B. Then, on the first reflecting surface 18a, light from a second light source (first light emitter) 21a (9b) is irradiated; and on the second reflecting surface 18b, light from a different second light source (second light emitter) 21b (9b) is irradiated. As such, in the present invention, both mode, i.e., the mode in which light is irradiated from a single light source to the first and the second reflector surfaces and the mode in which light is irradiated from respective light sources, are allowable.

In this case, as in the same way as the above-described seventh embodiment, the position relationships of the first and the second reflecting surfaces with respect to the mirror reflecting surface 10x are set in such a way that the irradiating angle θ2 of light irradiated from the first reflecting surface 18a to the reading surface R and the irradiating angle θ2 of light irradiated from the second reflecting surface 18b to the reading surface R are nearly same angle. In addition, it is preferable that the amount of light irradiated from the first reflecting surface 18a to the reading surface and the amount of light irradiated from the second reflecting surface 18b to the reading surface are set to be nearly same. This setting of the light amounts is performed by adjusting the brightness of the second light sources 21a and 21b and the light path lengths from the light sources to the reading surface.

Further, the illustrated α1 and α2 are set in such a way that the directions of the reflected (irradiating) angles of the first reflecting surface 18a and the second reflecting surface 18b shown in FIG. 9 are directed to irradiate the translucent surfaces 10y and 10z formed at the both end portions of the reflecting member 10a. Along with this, the first and the second reflecting surfaces 18a and 18b are formed to have curved shapes and are formed to focus light from the light emitters to direct to the translucent surfaces 10y and 10z.

[A Different Embodiment of the Reflecting Mirror]

Figure 10A:
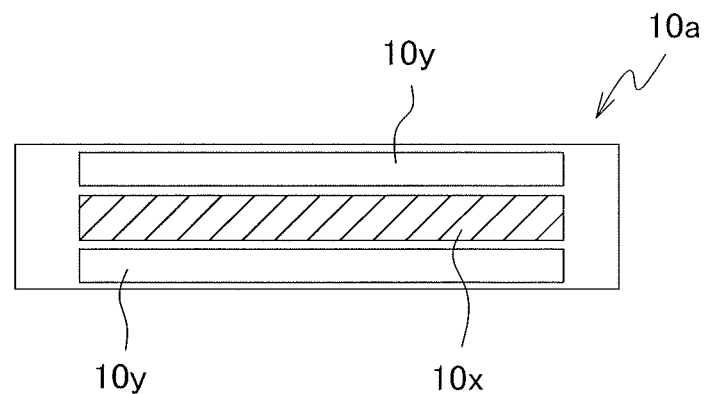
FIG. 10 shows a configuration of a reflecting member which is different from the above embodiments, wherein (a) is an external view in a case when a slit is provided, and (b) is an external vies in a case when it is configured of a thin mirror.
Figure 10B:
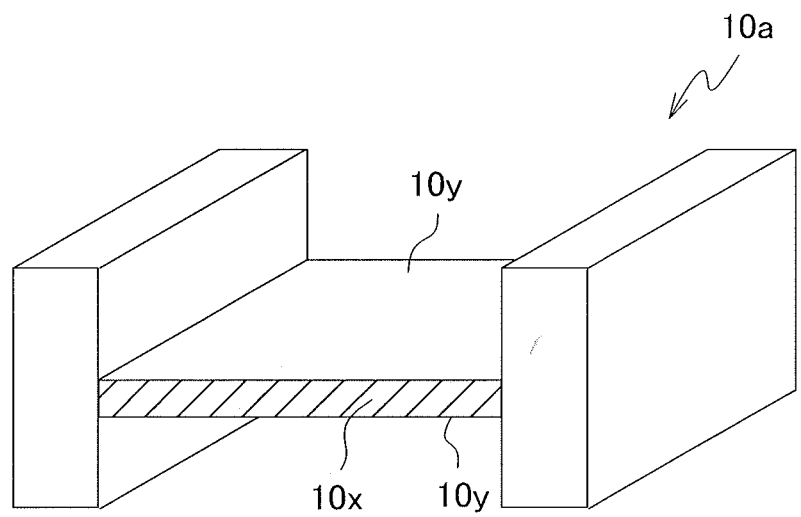

Note that it is also possible to configure the reflecting member (first mirror) to have a shape as shown in FIG. 10. In the figure, (a) shows a case where a slit is provided in the reflecting member, while (b) shows a case where translucent surfaces 10y are formed on both sides of the mirror reflecting surface 10x.

[Configuration of the Light Emitter]

The above-described first light source 9a (20) and the second light source 9b (21) respectively irradiate linear light Hp1 and Hp2 on the reading surface R from different two directions. Then, θ1 and θ2 are set as θ1>θ2 so as to lead diffusion light from the first light source 9a (20) to the read optical path Hr at the irradiating angle θ1 and to lead truly reflected light (precisely, a light close to the truly reflected light) from the second light source 9b (21) at the irradiating angle θ2. In addition, it is arranged at a position in such a way that the angle θ2 is close to the read optical path Hr.

To this end, it is configured that the amount of light emitted from the first light source 9a (20) is larger than the amount of light emitted from the second light source 9b (21). This is because, if the gloss level of the original document is high, a large amount of the irradiated light is reflected to the normally reflected direction. Therefore, there is a fear in that a large amount of light compared to the diffused and reflected reading is entered into the CCD so that the CCD is saturated. To prevent this, amount of light emitted from the first light source 9a used for the diffusion reading is set to be larger than the amount of light emitted from the second light source 9b used for the gloss reading. Note that it is the most preferable that the ratio between the amount of light emitted from the first light source 9a and the amount of light emitted from the second light source 9b is between around 10:1 to 20:1.

Figure 11:
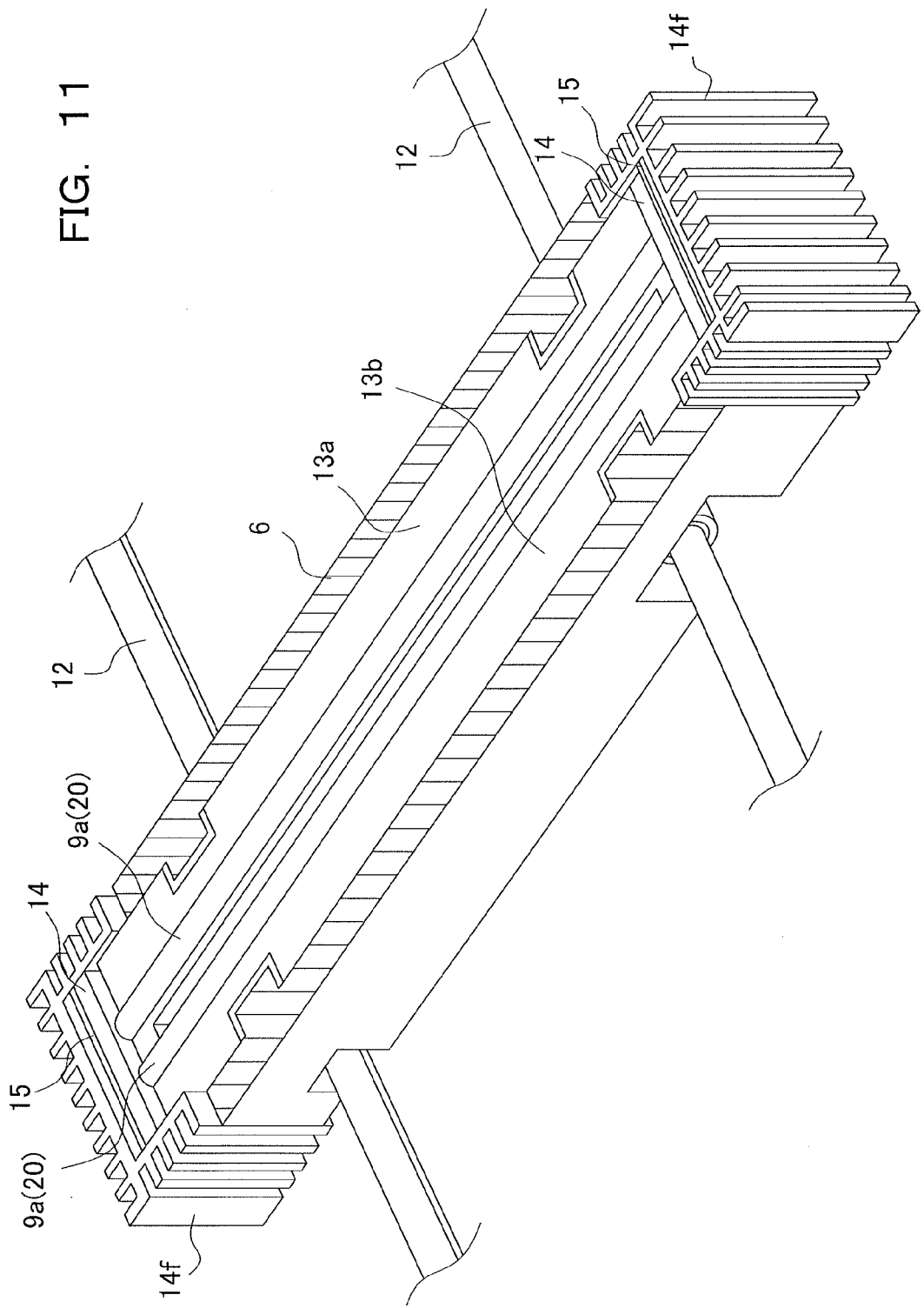
FIG. 11 is an external perspective view of the carriage in the apparatus shown in FIG. 1.

To this end, the first light source 9a and the second light source 9b are configured in such a way that linear light is irradiated on the reading surface R in a main scanning direction orthogonal to the right and left directions in FIG. 3(a). For this purpose, the first light source 9a and the second light source 9b are configured of a fluorescent lamp (cooled negative pool tube), an LED array, xenon lamp, and the like having a predetermined length. FIG. 11 shows a structure in which a light source 9 is mounted in the carriage 6. The previously described carriage 6 is provided with a light source accommodating portion (light leading member supporting frame) 13. The accommodating portion 13 is comprised of two portions, i.e., a first accommodating portion 13a and a second accommodating portion 13b.

In the above-mentioned light source accommodating portion 13, the first light source 9a and the second light source 9b are accommodated, each being configured of a light guiding body 30 and a first light emitter 20 (the first light source) or by the light guiding body 30 and a second light emitter 21 (the second light source). The first light source 9a and the second light source 9b have the same construction, and therefore the same symbols are labeled and the construction thereof will be explained with respect to the first light source 9a.

The light guiding body 30 is configured of, as shown in FIG. 12, a rod translucent member having a length in accordance with a read width (read line width) W of the reading surface R. The light guiding body 30 is formed of material having a rich translucency such as, for example, transparent acrylate resin, epoxy resin, or the like. The shape of its cross section is formed to be a rectangular or a quarter sector cross section as illustrated. At its left and right end surfaces 31L and 31R, the first light emitters 20 are arranged. In the light guiding body 30, a light scattering surface 32 and a light exiting surface 33 are arranged to oppose to each other.

As such, the light scattering surface 32 and the light exiting surface 33 are arranged to oppose at a distance Ld to be nearly parallel with a length of the read line width W. The light scattering surface 32 is subjected to a surface treatment in such a way that it has a concave-convex surface configured of a coating process, an etching, a mold forming process, or the like so as to diffusely reflecting the introduced light. The light exiting surface 33 is subjected to a surface finish to have a surface such as a lens surface rich with translucency.

Accordingly, light guided into the light guiding body 30 is diffused in predetermined directions by the light scattering surface 32. Then, light guided on the light exiting surface 33 is reflected to the inner side when the guided angle is larger than or equal to a predetermined critical angle, and is emitted to the outside when it is smaller than or equal to the critical angle. Light shown by arrows ha is reflected in the light guiding body 30 and is dispersed in the direction of the read line width W, while light shown by arrows hb is emitted from the light exiting surface 33 to the reading surface R. Note that, although it is not shown in the drawings, from the later described second light emitter 21, light is incident in spherical directions (360 degrees directions; the illustrated one is 60 degrees wide-angle directions) so as to irradiate light scattering surface 32 and the light exiting surface 33.

Here, an explanation is given for the first light emitter 20. The first light emitters 20 are arranged on at least one end surface of the light guiding body 30. In FIG. 12, a case is shown in which they are arranged on the left end surface 31L and on the right end surface 31R. In this case, the light sources on the left and right end surfaces are configured to produce a bilaterally symmetric appearance. In another case, although it is not shown in the drawings, the first light emitter 20 is arranged on one of the left and the right end surfaces, while a reflecting member (mirror plane member) is arranged on the other end surface. The reflecting member in this case is configured in such a way that a provisional light source is symmetric with respect to the first light emitter 20.

[Mode of the Arrangement of the Light Emitters]

The above-described first light emitter 20 is configured of at least two light emitters 41 and 42, three light emitters 41, 42, and 43, light emitters 41, 42a, and 42b, four light emitters 41, 42, 43a, and 43b, light emitters 41a, 41b, 42a, and 42b, or five light emitters 41, 42a, 42b, 43a, and 43b.

In this case, the light emitter 41 and the light emitter 42 exit light from the left end surface 31L at different positions between the light scattering surface 32 and the light exiting surface 33. Along with this, the light emitter 41 and the light emitter 42 are arranged at a distance in the light emitting path direction (shown in FIG. 9 by an arrow hx) directed from the light exiting surface 33 to the reading surface R.

That is, with respect to the scattering surface 32, the light emitter 41 is arranged at a distance Ld1 and the light emitter 42 is arranged at a distance Ld2 (Ld1<Ld2). The light emitting path direction hx of the illustrated light guiding body 30 is configured to coincide with the normal direction of the light scattering surface 32. Each of the light emitters 41, 42, and 43 is configured of a planar light emitting element, and is configured of a white LED.

Figure 13A:
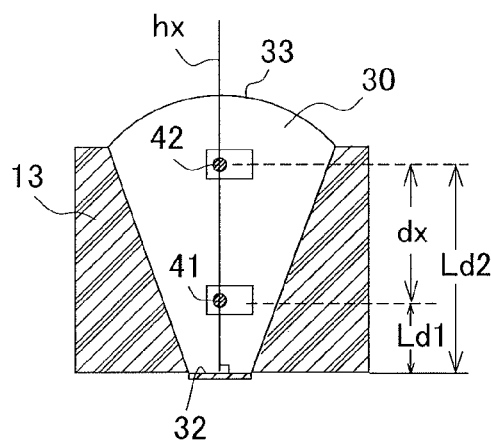
FIG. 13 is an explanatory view showing an arrangement structure of the light emitter of the light source shown in FIG. 12, wherein (a) shows a case when the light emitter is configured of two light emitting diodes, (b) and (c) show cases when the light emitter is configured of three light emitting diodes, (d) and (e) show cases when the light emitter is configured of four light emitting diodes, respectively, and (f) shows a case when the light emitter is configured of five light emitting diodes.

FIG. 13(a) shows a layout structure (first embodiment) of the first light emitter 20 configured of the two light emitting elements, i.e., the light emitter 41 and the light emitter 42. The light emitter 41 and the light emitter 42 are arranged along the normal line (light emitting path direction) hx of the light scattering surface 32. The light emitter 41 is arranged at the distance Ld1 from the light scattering surface 32, and the light emitter 42 is arranged at the distance Ld2. Between the both light emitters 41 and 42, an offset dx is formed.

Note that, as previously mentioned, with respect to the normal line hx, the light scattering surface 32 is formed in a band shape along the read line, the exit direction being set to be the direction orthogonal from its center (½ in the sub-scanning direction). The light emitters 41 and 42 are arranged on this normal line.

Figure 13B:
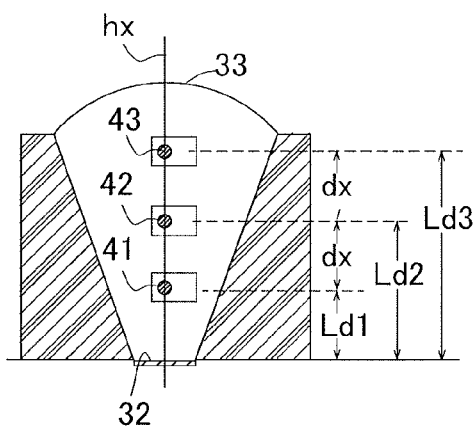

FIG. 13(b) shows a layout structure (second embodiment) of the first light emitter 20 configured of the three light emitting elements, i.e., the light emitter 41, the light emitter 42, and the light emitter 43. The light emitter 41 is arranged at the distance Ld1 from the light scattering surface 32; the light emitter 42 is arranged at the distance Ld2; and the light emitter 43 is arranged at the distance Ld3. Between the respective light emitters, the offset dx is formed. In this embodiment also, they are arranged on the above-mentioned normal line (light emitting path direction).

Figure 13C:
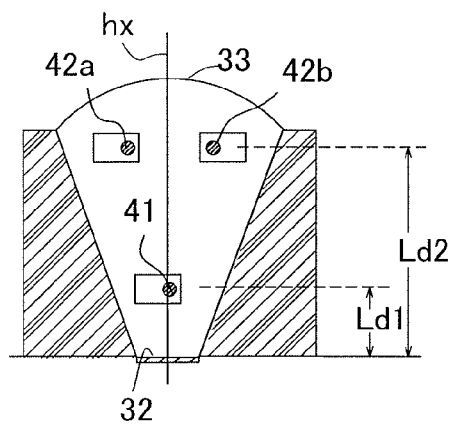

FIG. 13(c) shows a layout structure (third embodiment) of the first light emitter 20 configured of the light emitter 41 and the light emitter 42, wherein the light emitter 42 is configured of two light emitting elements 42a and 42b. The light emitter 41 is arranged at the distance Ld1 from the light scattering surface 32; and the light emitters 42a and 42b are arranged at the distance Ld2 from the light scattering surface 32. The light emitters 42a and 42b closely situated near the light exiting surface 33 are arranged at positions symmetric with respect to the normal line hx.

In this embodiment, it is characterized that the light emitter 42 arranged at positions closely situated near the light exiting surface 33 is configured of two light emitting elements 42a and 42b; and the two light emitters are arranged at positions symmetric with respect to the light exit path direction (normal line) hx.

Figure 13D:
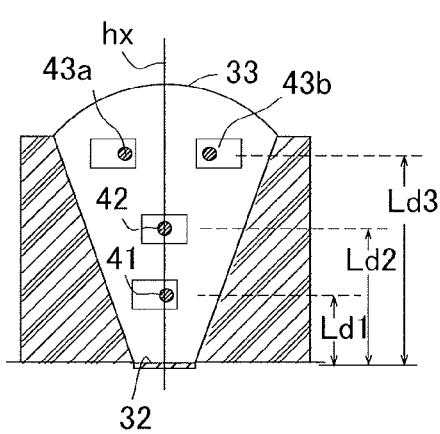

FIG. 13(d) shows a layout structure (fourth embodiment) of the first light emitter 20 configured of the light emitter 41, i.e., the light emitter 42, and the light emitter 43 wherein the light emitter 43 is configured of two light emitting elements 43a and 43b. The light emitter 41 is arranged at the distance Ld1 from the light scattering surface 32; the light emitter 42 is arranged at the distance Ld2; and the light emitter 43 is arranged at the distance Ld3. The light emitter 41 and the light emitter 42 are arranged on the normal line hx, and the light emitting elements 43a and 43b of the light emitter 43 are arranged at positions symmetric with respect to the normal line hx.

In this embodiment, it is characterized that the light emitter 43 arranged at positions closely situated near the light exiting surface 33 is configured of the two light emitting elements 43a and 43b; and the two light emitters are arranged at positions symmetric with respect to the light exit path direction (normal line) hx.

Figure 13E:
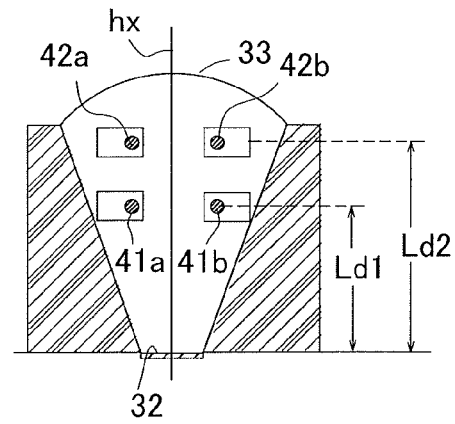

FIG. 13(e) shows a layout structure (fifth embodiment) of the first light emitter 20 configured of the light emitter 41 and the light emitter 42, wherein the light emitter 41 is configured of the two light emitting elements 41a and 41b; and the light emitter 42 is configured of the two light emitting elements 42a and 42b. The two light emitting elements configuring the light emitters 41 and 42 are arranged at positions symmetric to each other with respect to the normal line hx.

Figure 13F:
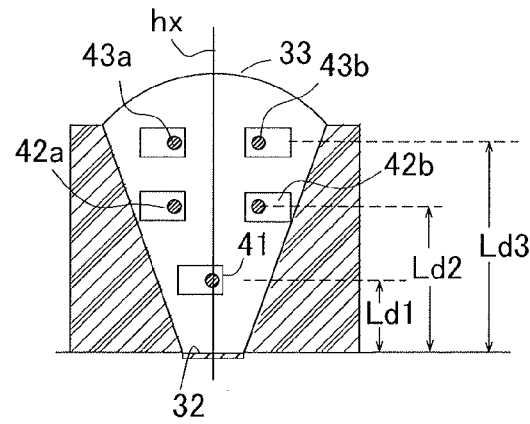

FIG. 13(f) shows a layout structure (sixth embodiment) of the first light emitter 20 configured of the light emitter 41, the light emitter 42, and the light emitter 43 wherein the light emitter 42 is configured of the two light emitting elements 42a and 42b; and the light emitter 43 is configured of the light emitting elements 43a and 43b. The light emitter 41 is arranged at the distance Ld1 from the light scattering surface 32; the light emitter 42 is arranged at the distance Ld2; and the light emitter 43 is arranged at the distance Ld3. The light emitter 41 and the light emitter 42 are arranged on the normal line hx; and the light emitting elements 43a and 43b of the light emitter 43 are arranged at positions symmetric with respect to the normal line hx.

In this embodiment, it is characterized that the light emitter 41 arranged at a position closely situated near the light scattering surface 32 is configured of a single light emitting element; the light emitter 43 arranged at positions closely situated near the light exiting surface 33 is configured of two light emitting elements; the light emitter 42 arranged at positions close to the light exiting surface 33 is configured of two light emitting elements; and the two light emitting elements constructing the light emitter 42 and the light emitter 43 are arranged symmetrically with respect to the normal line hx.

Note that the light emitters 40 in the above described first through sixth embodiments show an embodiment in which they are arranged at both ends of the light guiding body 30, however, as previously explained, it may also be possible to arrange a reflecting member (mirror surface member) in place of either one of the light emitters 40 so as to configure, by this reflecting member, a provisional light source similar to the light emitter 40.

As described above, the light sources for emitting light into the light guiding body 30 are configured of a plurality of light emitters having substantially the same wavelength; and the incident position from the light emitter 41 and the incident position from the light emitter 42 are set at positions at a distance in the exit light path direction (normal direction of the light scattering surface) hx. As such, by arranging the two or more light emitters at distances in the exit light path direction, it becomes possible to conform (to establish a complementary relationship between) the linear light directing from the light guiding body 30 to the reading surface R and the characteristics of the condenser lens.

[Installation Structure of a Circuit Board]

Here, the present invention is characterized in that the above-described light source 9 is installed in the carriage 6 as follows. As described above, the light guiding body 30 which constructs the light source 9 is mounted and fixed in the light source accommodating portion 13, while a heat dissipating member 14 is formed on the unit frame 11 of the carriage 6 in an integrated fashion. This heat dissipating member 14 is configured of metal material rich with heat conductivity such as aluminum alloy, a heat dissipating fin 14f being provided on its surround (see FIG. 11). A circuit board 16 is fixed on this heat dissipating member 14.

Between the circuit board 16 and a board installing portion 14a, a resin plate 15 is arranged, The resin plate 15 is made of insulating synthetic resin which is rich with elasticity. The circuit board 16 is fixed to the board installing portion 14a by a fixing plate 17 in a state where the resin plate 15 is interposed.

[Configuration of the Control of the Light Source]

The control of the light sources as previously described with reference to FIG. 2 will be explained. As shown in FIG. 2, the first light sources 9a (first light emitter 20) and the second light source 9b (light emitter 21) irradiate light on the reading surface R of the first platen 2 and the second platen 3. In this case, it is not always necessary to configure the first light sources 9a by the two light sources as illustrated, but may be configured of one or three or more light emitters. The reason why the illustrated first light sources 9a are configured of two light emitters is that, in the later described original document feeding apparatus B, the speed of the original document travelling along the second platen 3 is made to be faster than the moving speed of the carriage 6 along the first platen 2. That is, the reading speed at the first platen 2 is made to be faster than the reading speed at the second platen 3. Therefore, it is preferable to make the amount of light of the first light sources 9a irradiating on the original document at the first platen 2 to be larger than the amount of light of the first light sources 9a irradiating on the original document at the second platen 3.

It is possible to make such light amount adjustments by adopting either of the following methods. (1) Adjusted is the level of power to supply to the light source 9 mounted on the carriage 6. For example, a switching means for supplying power or supplying current is provided in a power supply circuit for supplying power to the first light source 9; and a light amount adjusting means is provided to adjust the level of power to be supplied to the lamp. The light amount adjusting means is widely known as PWM control, and specific descriptions thereof are omitted here.

Next method is (2) to provide a light amount adjusting means for selectively lighting at least two, i.e., the first and the second light emitters mounted in the carriage 6. The apparatus shown in FIG. 2 is configured in such a way that a first light guiding body 30a and a second light guiding body 30b are mounted in the carriage 6; when an original document on the first platen 2 is irradiated, a power is supplied to the first light guiding body 30a to irradiate light on the original document on the first platen 3; and when an original document on the second platen 2 is irradiated, a power is supplied to the first light guiding body 30a and the second light guiding body 30b to irradiate light on the original document on the second platen 2.

In such a configuration, the first light guiding body 30a is lighted when the carriage 6 is positioned at the first platen 3, and the first light guiding body 30a and the second light guiding body 30b are lighted when the carriage 6 is positioned at the second platen 2. By this means, it is possible to adjust the amount of light irradiated on an original document, and a switching circuit for turning "ON" and "OFF" the supply power constitutes the light amount adjusting means.

Accordingly, with respect to the first light source 9a and the second light source 9b, when the original document on the first platen 2 is to be read, and when the original document on the second platen 3 is to be read, an image on the reading surface R is read in a state in which the first light sources 9a is turned on and the second light source 9b is turned off, and then an image on the reading surface R is read in a state in which the second light source 9b is turned on and the first light sources 9a is turned off. Then, by synthesizing the two read data, an image of a gloss original document can be read.

[An Embodiment of the Data Synthesis]

Figure 15:
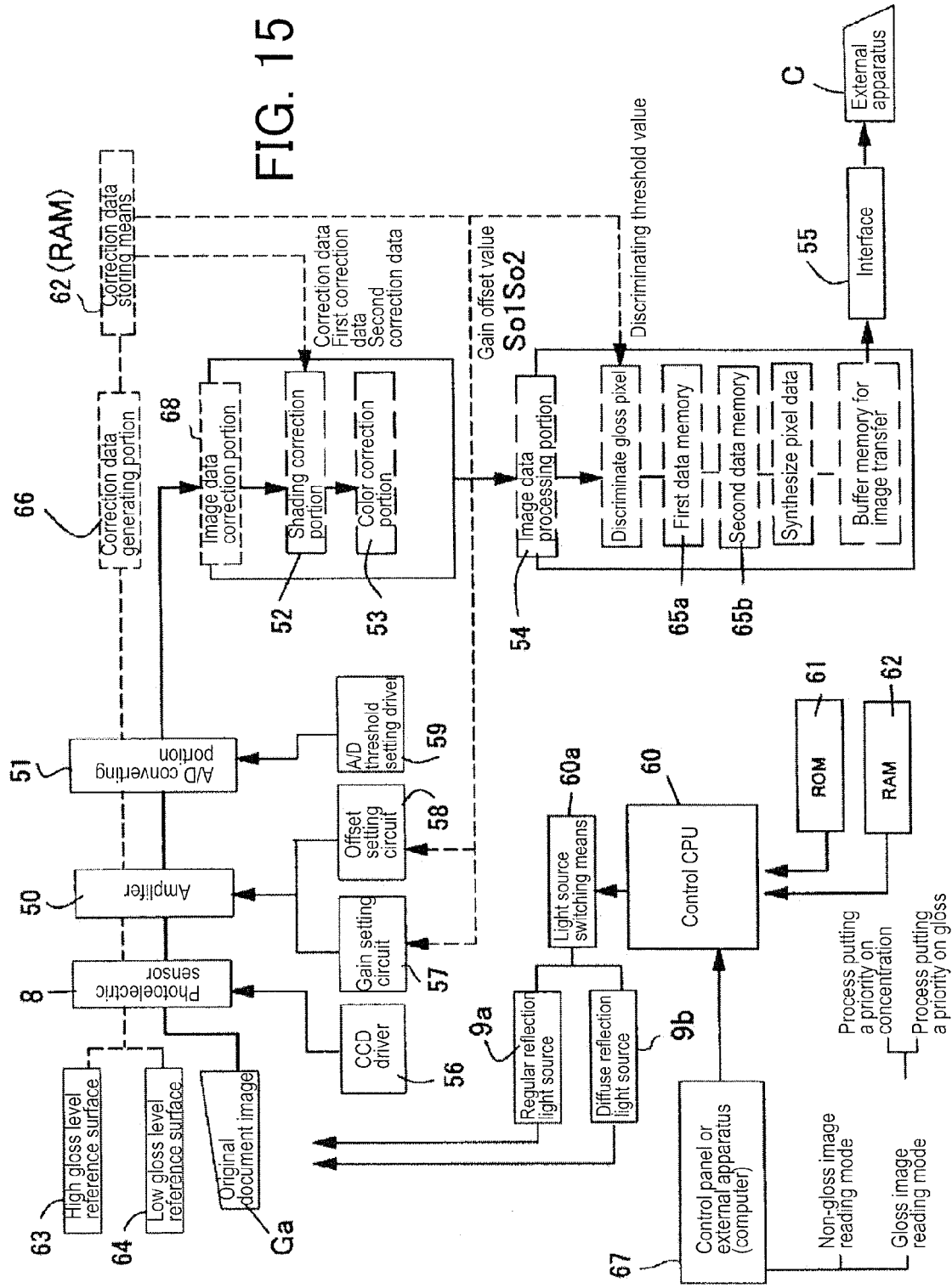
FIG. 15 is a processing circuit of an image data output from a photoelectric sensor.

Next, a configuration of an image processing in the image reading apparatus A constructed as previously described will be explained. FIG. 15 shows a processing circuit for processing an image data output from the line sensor 8. It is configured in such a way that a signal (analog) output from the line sensor 8 is sent through an amplifier 50, an A/D converting portion 51, a shading correction portion 52, and a color correction portion 53 to an image data processing portion 54; and is transferred through an external interface 55 to an external apparatus C. Separate from this, it is configured in such a way that the output signal from the line sensor 8 is sent through the amplifier 50 and the A/D converting portion 51 to a correction data generating portion 66, and the correction data is stored in a storing means (RAM) 62.

A CCD driver 56 is provided for the above-mentioned line sensor 8 (the illustrated one is a CCD), to generate a timing for controlling the sensor output. This line sensor 8 reads, as described later, an image data and reads a reference plate (a later described reference surface 66 having a high gloss level and a reference surface 64 having a low gloss level). To the amplifier 50, a gain setting circuit 57 and an offset setting circuit 58 are connected. In addition, to the A/D converting portion 51, an A/D threshold setting circuit 59 for setting a reference threshold for the A/D conversion.

On the other hand, it is configured in such a way that the reading of an image by the line sensor 8 is controlled by a control CPU 60. The control CPU 60 is configured to perform "a reference data reading" and "an image reading" in accordance with a control program prepared in a ROM 61 and control data prepared in a RAM 62. By the "reference data reading", the reference surface 66 having a high gloss level and the reference surface 64 having a low gloss level are read; and by the "image reading", an original document image Ga set on the flatbed platen 2 is read.

The above-mentioned amplifier 50 amplifies an image signal output from the line sensor 8. To this end, the gain setting circuit 57 and the offset setting circuit 58 are provided. Here, the gain value and the offset value are previously set as the one for "diffuse reflection output value" and for "regular reflection output value" respectively in accordance with a later-described method, and are prepared in the storing means (ROM) 62.

The above-mentioned A/D converting portion 51 converts the output value (analog value) from the line sensor 8 into a digital value. The A/D converting portion has an A/D converter to convert the analog output value into a digital value. By this A/D conversion, it is converted into a digital value having a predetermined gradation of concentration, for example, 256 gradation or 128 gradation, or into a binarized digital value.

The above-mentioned shading correction portion 52 corrects the output signal which has been digitized by the A/D converter. The brightness unevenness, which is caused by the variation of the amount of light in the line direction (main scanning direction) of the previously described light sources 9a and 9b, the variation of the line sensor 8, or the variation of the optical system (the reflecting mirrors 10, the condenser lens 7 and the like) for taking an image, in the output value is corrected. This shading correction data is obtained by a later described method and is stored in the storing means (ROM) 62.

The above-mentioned color correction portion 53 corrects, in the same way as the shading correction, the output signal which has been digitized by the A/D converter. The output value is subjected to a process such as gamma correction or a noise rejection.

The above-mentioned image data processing portion 54 performs a preprocessing for transferring an image data, which has been processed by the A/D conversion, the shading correction, color correction and the like, to an external. In the illustrated apparatus, the previously described "diffusion reflection output value" and the "regular reflection output value" are synthesized to obtain image data. The method will be described later.

In such a configuration, in the illustrated apparatus, an executing program in the control CPU 60 is configured in such a way that the above-mentioned "image reading" is performed by executing a diffuse reflection reading in which light is irradiated from the previously described first light sources (diffuse reflection light sources) 9a and the diffuse reflection light is subjected to photoelectric conversion by the line sensor 8, and by executing a regular reflection reading in which light is irradiated from the previously described second light source (regular reflection light source) 9b and the regular reflection light is subjected to photoelectric conversion by the line sensor 8.

Then, an image data of an image of an original document having a low gloss level (hereinafter referred to as a "non gloss image") is obtained by the diffuse reflection reading (non gloss image reading mode), and an image of the other original document (hereinafter referred to as a "gloss image") is obtained by the regular reflection reading and the diffuse reflection reading (gloss image reading mode).

That is, in case of the non gloss image, light from the first light sources 9a is irradiated on the original document image Ga on the platen and the reflected light is subjected to photoelectric conversion by the line sensor 8; and in case of the gloss image, light from the second light source 9b is irradiated on the original document image Ga on the platen and the reflected light is subjected to photoelectric conversion. When a part of the original document image Ga is a gloss image (an original document image having a different gloss level), gloss pixel data and non-gloss pixel data from the sensor outputs of the regular reflection reading and the diffuse reflection reading are synthesized.

Note that the illustrated apparatus is configured in such a way that, when the gloss image reading mode is selected, the regular reflection reading and the diffuse reflection reading are performed on the same image so as to obtain one image data from the output values of the both sensors.

Accordingly, when the whole of the original document image is a gloss image, an image data from only the regular reflection reading data is obtained as a result.

To this end, a mode setting is performed in the control CPU 60 by an input means (control panel) 67 for an image reading mode (non-gloss image reading mode or gloss image reading mode). Along with this, a light switching means 30a is formed to switch between the first light sources 9a and the second light source 9b in accordance with the mode set in the control CPU 60.

Specifically, to a power supply circuit (not shown in the drawings) for the first and the second light sources 9a and 9b, a "light on" or a "light off" command and a light amount adjusting command are controlled to be sent from the control CPU 60.

[Correction Data Generating Portion]

As shown in FIG. 15, the output value from the line sensor 8 is sent through the amplifier 50 and the A/D converting portion 51 to the correction data generating portion 66. In the correction data generating portion 66, "shading correction data" and "discriminating threshold" are set. The shading correction data generates correction data for the shading correction portion 52, and the discriminating threshold generates a reference value for discriminating whether it is a gloss pixel or a non-gloss pixel. The generated "values" are stored in the correction data storing means (RAM) 62.

Figure 14:
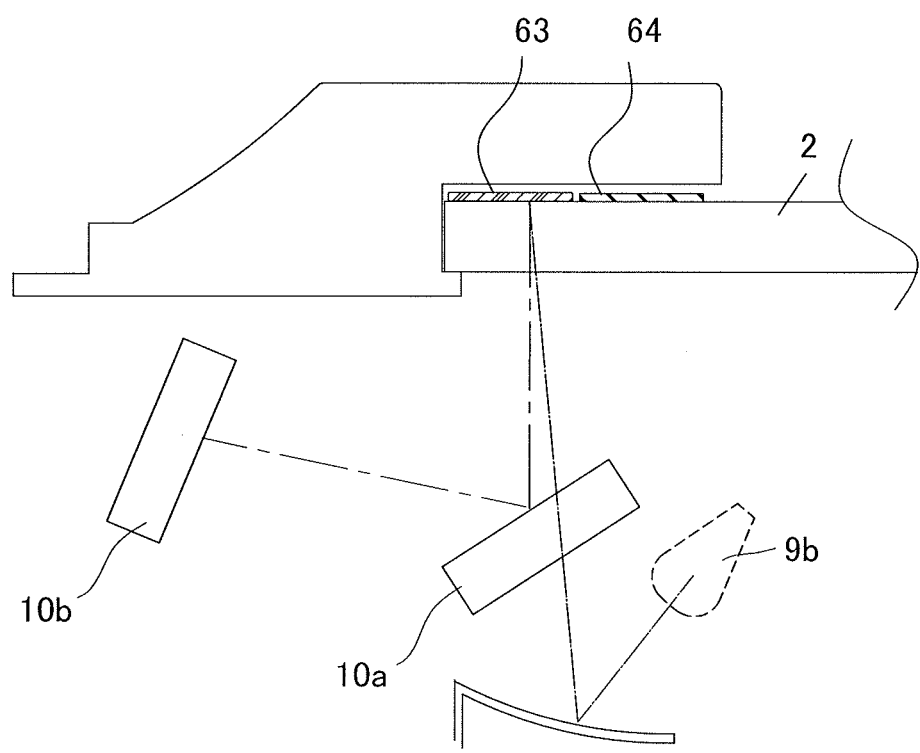
FIG. 14 is an explanatory view of a main portion of an image reading portion in the apparatus shown in FIG. 1 wherein an arrangement configuration view of a reference plate is shown.

Accordingly, on the previously described flatbed type platen 2, reference plates 63 and 64 are provided as shown in FIG. 14. These reference plates 63 and 64 are arranged at an outside of the image reading area of the flatbed type platen 2. The first reference plate is formed as a high gloss level reference surface 66 and the second reference plate is formed as a low gloss level reference surface 64.

With respect to the high gloss level reference surface 66 and the low gloss level reference surface 64, when light (illustrated one is LED light) is irradiated from the previously described second light source 9b, the gloss level of the high gloss level reference surface 66 is set to be [α %], and the gloss level of the low gloss reference surface 34 is set to be [β %]. The [β %] is set to be the maximum gloss level of the original document image Ga according to the apparatus spec. and the [β %] is set to be the minimum gloss level.

For example, when the maximum gloss level of the original document image for the image reading is the one of a metallic print of gold, silver, or metal color, the [α %] is set to be its gloss level, and when the maximum gloss level of the original document image for the image reading is the one of a photo print, the [α %] is set to be its gloss level. When the minimum gloss level of the original document image for the image reading is the one of an usual regular paper black and white print, the [β %] is set to be its gloss level.

As such, the high gloss level reference surface 66 and the low gloss level reference surface 64 are set to be the maximum gloss level image and the minimum gloss image in accordance with conditions such as texture and tone of the original document image Ga used, intended use of the obtained image data such as design use or document use, and the like. The illustrated reference plates are white reference surfaces which are set to be the high gloss level reference surface 66 and the low gloss level reference surface 64. As such, by forming the low gloss level reference surface (plate)

by a white reference surface, it becomes possible to obtain a white reference value at a time of "diffuse reflection reading".

Then, images of the high gloss level reference surface 66 and the low gloss level reference surface 64 are read by the line sensor 8 mounted in the optical carriage 6. According to the present invention, the image readings of the first and the second reference plates 63 and 64 are performed (1) by subjecting the regular reflection light from the reference plates 63 and 64 to photoelectric conversion by light from the second light source 9b (the first light sources 9a are turned off and the second light source 9b is turned on).

Figure 16A:
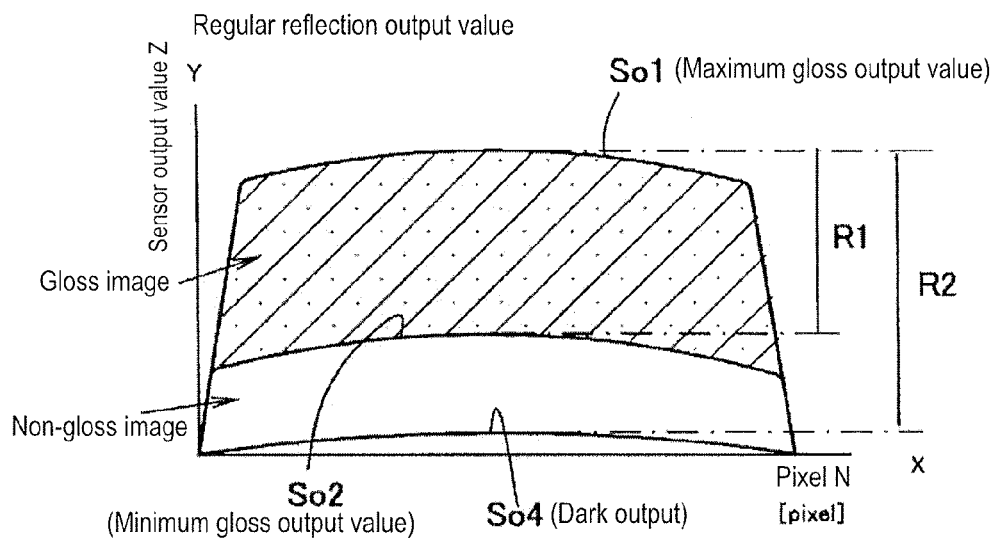
FIG. 16 is an explanatory view of an image data correcting circuit of a data processing portion, wherein (a) shows a regular reflection output, (b) shows a diffuse reflection output, and (c) is a conceptual diagram of a discriminating circuit for gloss image data.
Figure 16B:
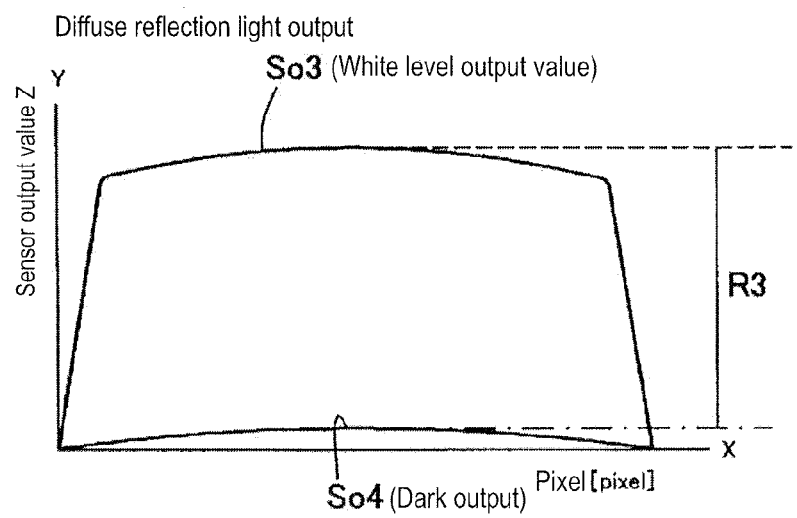

By this, from the line sensor 8, the maximum gloss output value So1 is output from the corrected data generating portion 66, and the minimum gloss output value So2 is output from the low gloss level reference surface 64 as shown in FIG. 16(a). In the figure, the X axis direction represents the pixels N in the main scanning direction of the line sensor 8, and the Y axis direction represents the output values Z. In the figure, an example of the output values Z is shown, where both ends portions of the pixels N in the main scanning direction show unevenness of brightness of the light source, in which unevenness of brightness (not shown in the drawings) of bits from the line sensor 8 appear in each pixel.

Next, (2) by light from the first light sources 9a (the first light sources 9a are turned on and the second light source 9b is turned off), the diffuse reflection light from the low gloss level reference surface 64 is subjected to photoelectric conversion. By this means, from the line sensor 8, a white level output value So3 from the low gloss level reference surface 64 as shown in FIG. 4(b) is output. Further (3), in a state when both of the first light sources 9a and the second light source 9b are turned off, a black output value (dark output value) So4 is obtained from the line sensor 8.

Note that, in the present invention, in addition to the case where the white level output value So3 is obtained by the photoelectric conversion of the diffuse reflection light from the low gloss level reference surface 64 by light from the first light sources 9a, it is also possible to obtain the white level reference value as the minimum gloss level output value So2 obtained by light from the second light source 9b. There is no great difference in the correction of the brightness variation of the light sources or the brightness variation of the line sensor even when the later described white level output value So3 is obtained by the diffuse reflection reading or by the regular reflection reading.

Accordingly, when the reference output values So1, So2, and So3 are obtained by the above-mentioned reference surface readings (1) and (3), the preparation of the correction data needs a shot time and the processing steps are easy, while when the reference output values are obtained by the reference surface reading (1), (2) and (3), it is possible to prepare more precise correction data.

Based on the thus obtained reference output values So1 (maximum gloss level output value), So2 (minimum gloss level output value), So3 (white level output value), and So4 (dark output value), the "regular reflection reading shading correction value", "diffusion reflection reading shading correction value", and "gloss pixel discriminating threshold value" are set.

First, with respect to the regular reflection reading shading correction value, the illustrated apparatus is configured in such a way that a first correction data and a second correction data are generated in order to perform the "shading correction of regular reflection output value". This is because, when a reproducibility of a gloss level of a gloss original document is necessary, the following first correction data is set, and when a reproducibility of a gradation of a concentration of the image is necessary, the following second correction data is set, in accordance with mode selection by a user.

The above-mentioned first correction data is normalized to a predetermined gradation of a concentration by a range R1 between the maximum gloss level output value So1 and the minimum gloss level output value So2 shown in FIG. 16(a). That is, the maximum output value So1 shown in FIG. 16(a) is normalized to have a predetermined gradation of a concentration, for example, 256 shades of gray. The normalized data is stored as RGB data, in bits of the line sensor 8, in a memory table in the storing means (RAM) 62. The second correction data is normalized to a predetermined gradation of a concentration by a range R2 between the maximum gloss level output value So1 and the dark output value So4 shown in FIG. 16(a).

As such, as shown in FIG. 16(a), the data widths of the range R1 and the range R2 are in a relation "range R1>range R2". The first correction data is normalized in only the data width of the gloss image area so that an output correction with good reproducibility of gloss image quality can be obtained. Also, the second correction data is normalized in a normal image (non-gloss image area) area and a gloss image area so that an output correction with a good reproducibility of a gradation of a concentration can be obtained.

Specifically, when the correction is performed by the first correction data, a gloss image can be obtained with a high precision, however, for example, a black character may have a gray image quality; and when the correction is performed by the second correction data, the gradation of concentration can be obtained with a high precision, however, for example, there may be a case in which a black part of a gold or silver metallic print area is not shown.

Next, the diffusion reflection reading shading correction value is normalized to have a predetermined gradation of a concentration in a range R3 between the white level output value So3 and the dark output value So4, and is stored in the memory table.

Based on such a shading correction data, the output value of the line sensor 8 at the time of performing the image reading is corrected to be flat by the shading correction data. That is, an error or reading (variability in the brightness) of the obtained output value from the sensor is corrected by the correction data. This shading correction is performed after the output value of the line sensor 8 which has read the image is amplified, and the converted with a digital value by the A/D converting portion 51.

With respect to the maximum gloss output value So1 and the minimum gloss output value So2 obtained as described above, when the output value from the line sensor at the time of performing a regular reflection reading is amplified by the amplifier 50, the gain setting circuit 57 sets the gain value as the maximum gloss output value So1, and sets the offset value of the offset setting circuit 58 as the So2. Whereby, the gloss area can be reproduced with a high gradation.

[Image Synthesis]

The present invention is characterized in that "whether it is a gloss pixel or not" is determined with reference to the minimum gloss level output value So2 obtained by the above-described method. To this end, as described before, the low gloss level reference surface 64 is provided on the flatbed type platen 2 so that the reflected light from the second light source 9b is photo-electrically converted, and is stored as a discriminating threshold in the storing means (RAM) 62.

Then, after correcting the output value from the line sensor 8 when a light is irradiated from the second light source (regular reflection light source) 9b by an image data correction portion 68, the image data processing portion 54 compares the corrected output value Sy with the discriminating threshold. By this comparison, if the corrected output value Sy is larger than the discriminating threshold, it is determined as a gloss pixel data Sd1 is obtained.

Figure 16C:
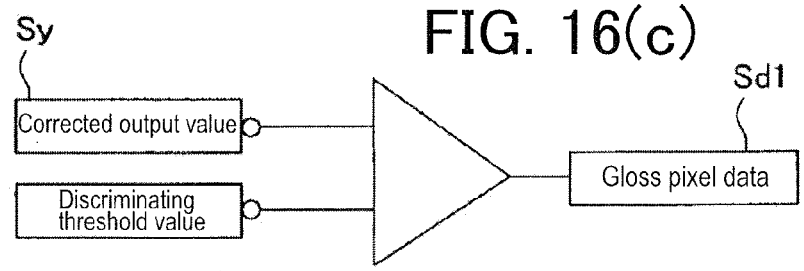

In this case, as shown in FIG. 16(c), the corrected output value Sy and the discriminating threshold are compared by a comparator, and based on the compared result, it is determined whether or not it is a gloss pixel. The gloss pixel data Sd1 is stored in, for example, a corresponding address in a first memory 65a of a buffer memory 65.

Along with this, the image data processing portion 54 performs a data correction on the output value of the line sensor 8 when light is irradiated from the first light sources (diffuse reflection light sources) 9a, and then the corrected output value Sy is stored in, for example, a corresponding address in a second memory 25b of a buffer memory 65.

Image data processing portion 54 reads, from the second memory 25b, the non-gloss pixel data Sd2 obtained by the diffusion reflection reading, and reads, from the first memory 25a, the gloss pixel data obtained by the regular reflection reading, and synthesizes both data. If there is the gloss pixel data Sd1 at the same address for the non-gloss pixel data Sd2, this image synthesis is performed by, for example, replacing the pixel with a gloss pixel data Sd1.

By this means, the image data at the all addresses are obtained by the synthesis of the non-gloss pixel data Sd2 and the gloss pixel data Sd1, and whether it is a gloss pixel or not is determined by the comparison of the corrected output value Sy, obtained by the regular reflection reading, with the discriminating threshold.

As such, the present invention is characterized in that the low gloss level reference surface 64 is set to have a gloss level according to the use of the image data, and the output value (minimum gloss level output value) So2 of the line sensor 8 obtained by reading the reference surface by the regular reflection reading is made to be the discriminating threshold value. Whereby, it becomes possible to output the image data with a gloss repeatability adapted to the intended use.

[Image Reading Operation]

Figure 17:
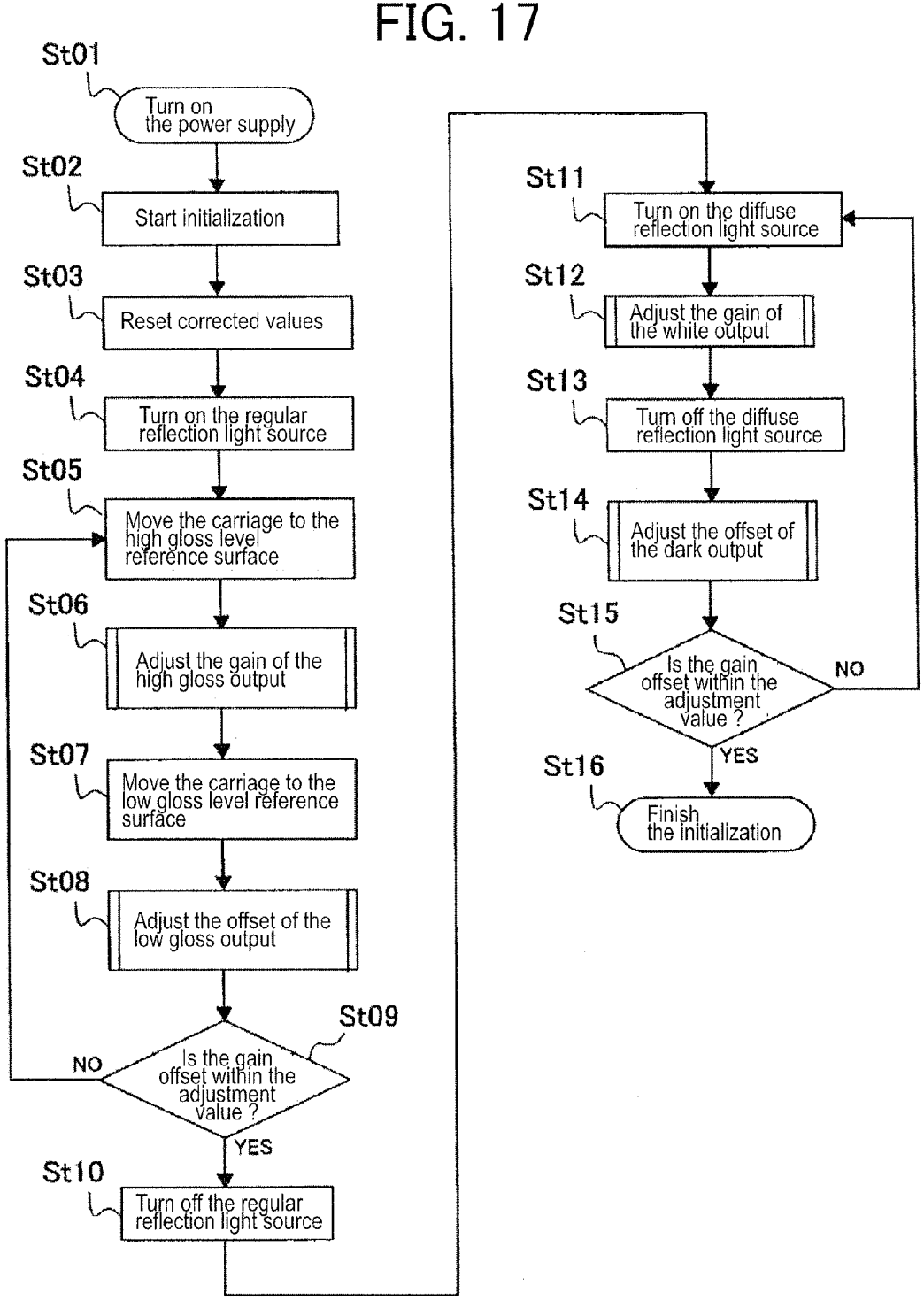
FIG. 17 is a flowchart showing an initializing operation of the apparatus shown in FIG. 1.

Next, an image reading operation in the above-described apparatus will be explained with reference to FIG. 17. FIG. 17 shows an initializing operation of the apparatus. When a power supply of the apparatus is turned on (St01), an initializing operation starts (St02). By the start of the initialization, the carriage 6 is moved to a predetermined home position so that setting values of respective circuits (a gain value, an offset value, various correction values) are reset to initial values (St03).

Then, the control CPU 60 turns on the second light source 9b (St04) and moves the carriage 6 to the read position of the high gloss level reference surface 66 (St05). Then, the high gloss side gain adjustment is performed (St06) with reference to the output value of the line sensor 8 from the high gloss level reference surface 66. Then, the carriage 6 is moved to the read position of the low gloss level reference surface 64 (St07), or, the lamp is turned off without moving the carriage 6, to perform a low gloss side gain adjustment (St08).

Next, the control CPU 60 determines whether or not the gain value and the offset value are within a preset default value (St09). If this determination results "NO", the gain offset adjustments (St05-St08) are repeated.

Next, the control CPU 60 turns off the second light source 9b (St10) and turns on the first light sources 9a (St11). Then, the carriage 6 is moved to the read position of the low gloss level reference surface (white reference surface) 34 to perform the gain adjustment (St12). Then, in a state where the first light sources 9a are turned off (St13), the offset adjustment is performed based on the dark output value So4 of the line sensor 8 (St14), and it is determined whether or not the gain offset value is within the preset default value (St15). If this determination results "NO", the gain offset adjustments (St12-St14) are repeated; and if it is "YES", the control CPU 60 finishes the initialization operation (St16).

Figure 18:
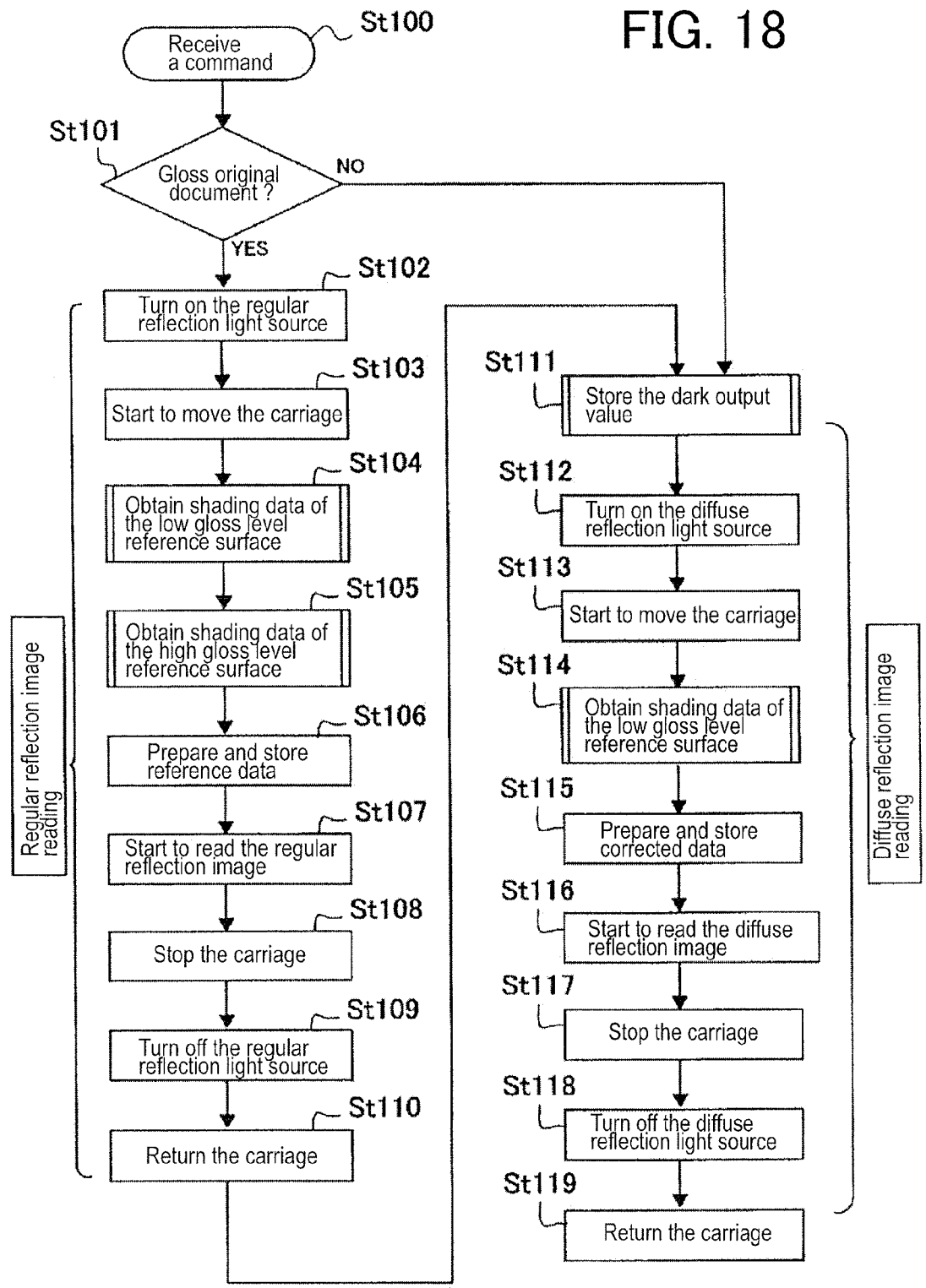
FIG. 18 is a flowchart showing an execution sequence of an image reading operation according to the present invention.

Next, an executing procedure of the image reading operation will be explained with reference to FIG. 18. To this end, the control CPU 60 receives an input signal from a not shown control panel 67 or a command signal from an image handling apparatus such as a computer or the like. As this input signal or the command signal, an image reading condition (color or monochrome, resolution, reduced magnification ratio, and the like) and a reading mode setting signal such as the "gloss image reading" or the "non-gloss image reading" are received (St100). If the "gloss image reading" mode is selected, a finishing condition such as a "finishing putting a priority on concentration" or "finishing putting a priority on gloss" is received.

In the above-described reading condition, when the "gloss image reading" mode is selected ("YES" at St101), the process proceeds in the next operation; and when the "non-gloss image reading" mode is selected ("NO" at St101), the later described steps St112-St119 are performed.

In the mode of the "gloss image reading", second light source 9b is turned on (St102), and the carriage 6 is moved to the position of the low gloss level reference surface 64 (St103). Then, at that position, the output value So2 of the low gloss level reference surface 64 is obtained from the line sensor 8 (St104). Then, the carriage 6 is moved to the high gloss level reference surface 66 so as to obtain the output value So1 of the high gloss level reference surface 66 (St105).

The thus obtained maximum gloss output value So1 and the minimum gloss output value So2 are used to prepare the previously-mentioned first correction data and the second correction data with reference to the dark output value So4 already obtained and stored in the RAM 62, and is stored in the storing means (RAM) 62. Along with this, a threshold value, which set with reference to the minimum gloss output value So2, is stored in the RAM 62 (St106).

Next, the control CPU 60 reads the original document Ga on the flatbed type platen 2 in the state where the second light source 9b (regular reflection light source) is turned on (St107). This data obtained by the regular reflection reading is stored in a buffer memory 65, digitized by the previously mentioned amplifier 50 and the A/D converting portion 51, and the shading correction and the color correction is performed by the image data correction portion 68 in parallel with the image reading. Then, the corrected output value Sy is compared with the discriminating threshold value and is stored in the first memory 65a.

When the reading of the whole original document image by the regular reflection reading (St107) is finished, the control CPU 60 stops the carriage 6 (St108), and the second light source (regular reflection light source) 9b is turned off (St109). Along with this, the carriage 6 is returned back to the read starting position (St110). In this returning process, the output value of the line sensor 8 is obtained, and is stored as the dark output value So4 in the RAM 62 (St11).

Next, the control CPU 60 turns on the first light sources (diffuse reflection light sources) 9a (St112), and moves the carriage 6 to the reading position of the low gloss level reference surface (St113). Then, from the output value of this low gloss level reference surface 64, the white level output value SO3 is obtained from the output value of this low gloss level reference surface 64 (St114). This data generates the shading correction data in the same way as mentioned before, and is stored in the memory table in the storing means (RAM 62) (St115).

Next, the control CPU 60 moves the carriage 6 to the read starting position to perform the diffuse reflection reading (St116). The obtained data is digitized by the amplifier 50 and the A/D converting portion 51 in the same way as mentioned before, and, is stored in a second memory 65b after performing the shading correction and the color correction by the image data correction portion 68.

After this, the control CPU 60 stops the optical carriage 6 (St117), and turns off the first light sources (diffusion reflection right sources) 9a (St118). Then, the optical carriage 6 is returned back to the initial position (home position) (St119).

Figure 19:
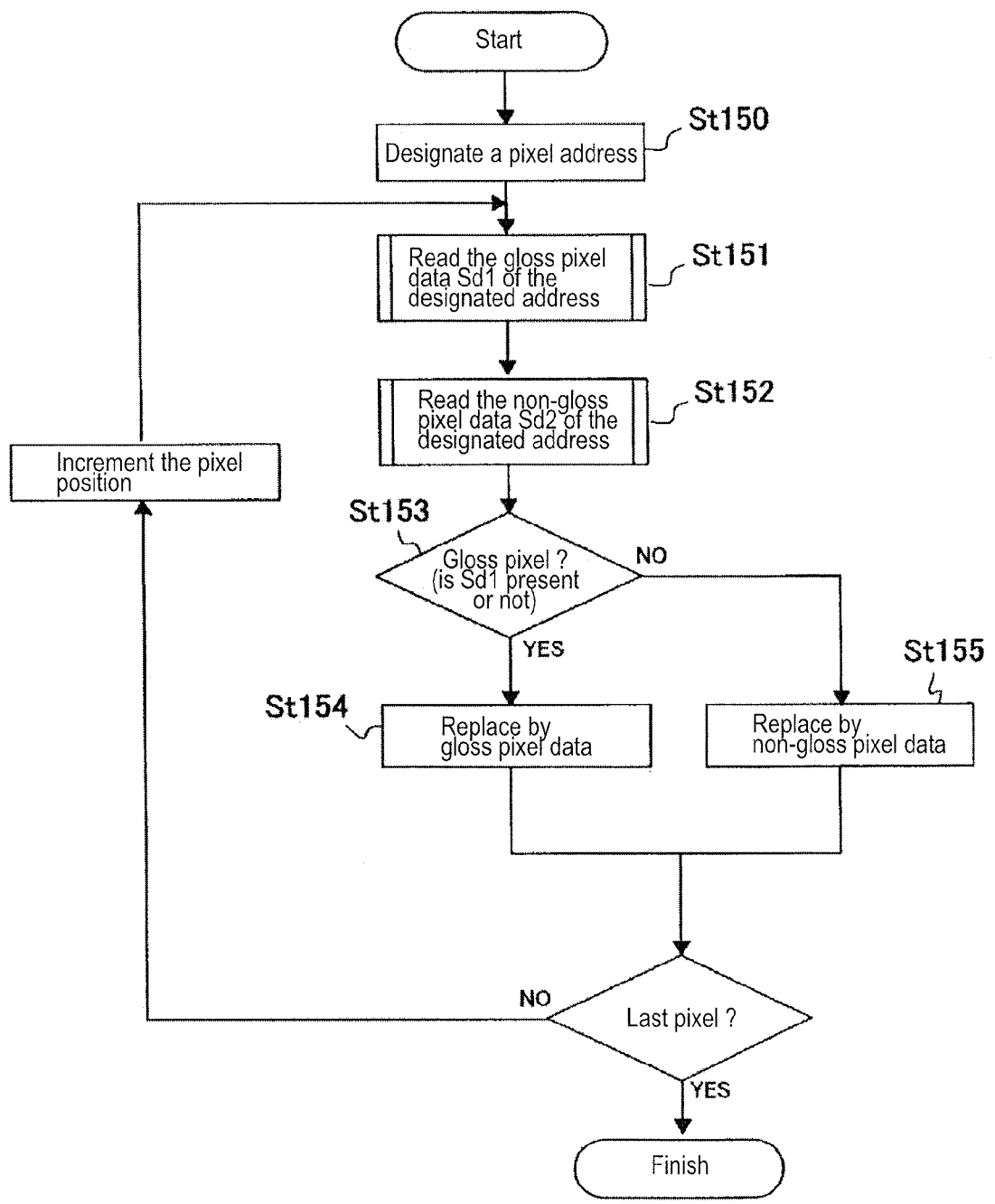
FIG. 19 is a flowchart showing an image data obtaining method according to the present invention.

Next, obtaining of the image data will be explained with reference to FIG. 19. The pixel data stored in the first memory 65a of the buffer memory 65 by the above-described regular reflection reading is stored as the gloss pixel data Sd1 of a pixel having a higher gloss level in comparison with the discriminating threshold value. Also, the pixel data stored in the second memory 65b of the buffer memory 65 is subjected to data correction to be a non-gloss data, and is determined as the non-gloss pixel data Sd2.

Then, the control CPU 60 designates a pixel of the line sensor (St150). This pixel designation is performed by, for example, sequential designation. Then, the gloss pixel data Sd1 is read from the first memory 65a (St151), and at the same time, the non-gloss pixel data Sd2 is read from the second memory 65b (St152). In this case, if there is the gloss pixel data Sd1 in the designated pixel (when it is "YES" at St153), the non-gloss pixel data Sd2 is replaced by the gloss pixel data Sd1 (St154). If there is no gloss pixel data Sd1 in the designated pixel (when it is "NO" in St153), the non-gloss pixel data Sd2 is respectively stored as a pixel data in the transfer buffer (St155).

Figure 20:
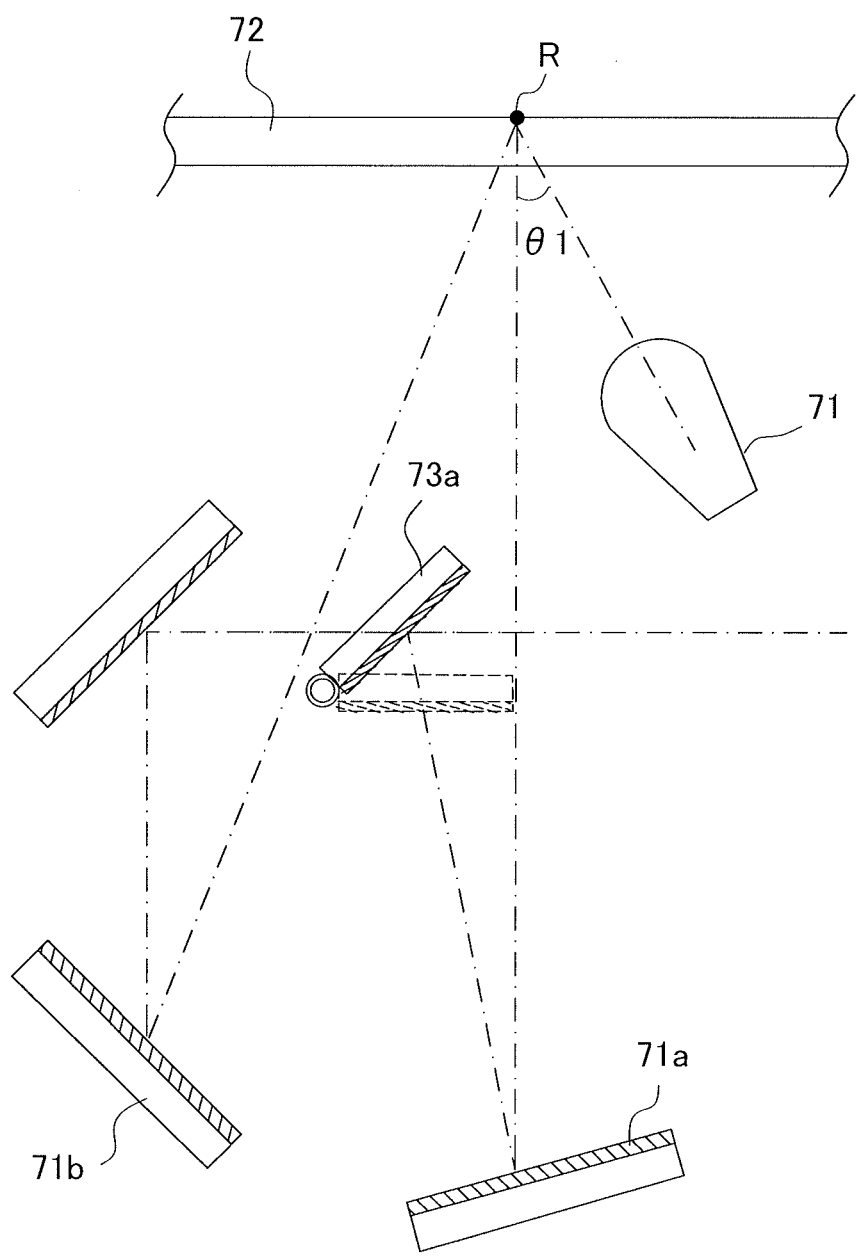
FIG. 20 is an explanatory view of a configuration of a light source different from the apparatus shown in FIG. 1.
Figure 21A:
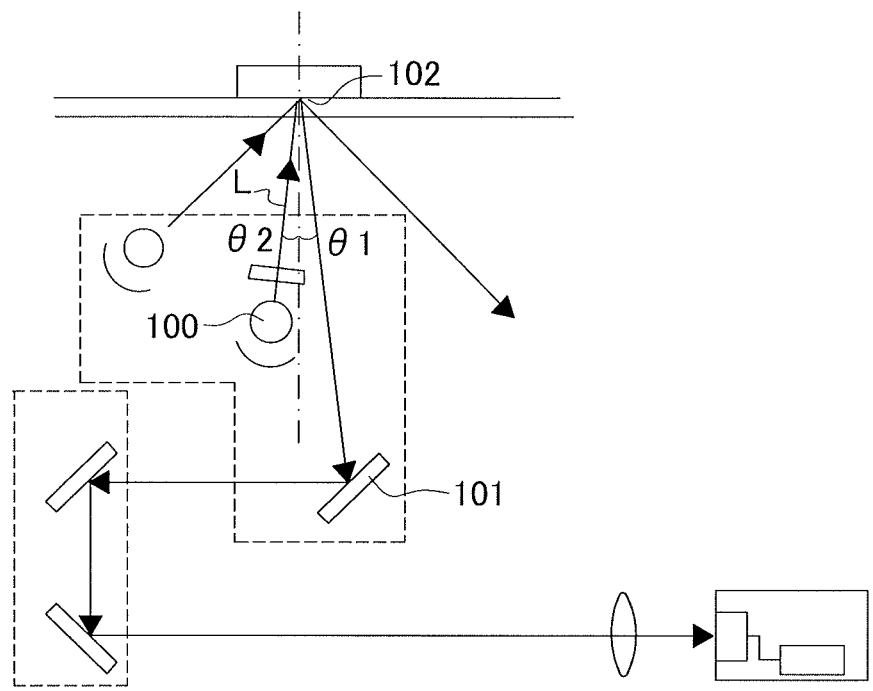
FIG. 21 is an explanatory view showing a conventional example of a light source mechanism.
Figure 21B:
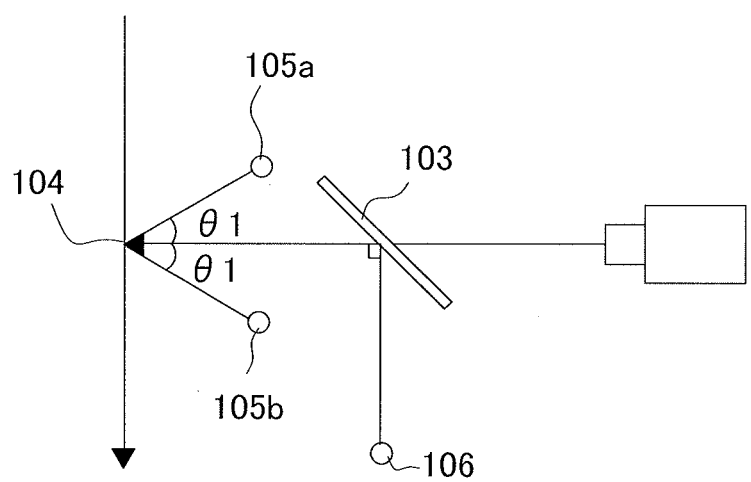

Note that, in the above-described embodiment, the first light sources (first light sources) 9a and the second light sources (second light sources) 9b are respectively configured of two different light emitters (the illustrated ones are LED light emitters), however, as shown in FIG. 20, it is also possible to configure by a single light emitter 71 and to configure by a first light source 71a for irradiating light from this light emitter to a platen 72 at an angle θ1 and a second light source 71b for irradiating light at an angle θ2.

In this case, for example, a shifting means (for example, an electromagnetic solenoid) is provided to shift a first reflecting mirror 73a at an angle position for guiding diffusion reflection light from the first light source 71a to a photoelectric sensor (solid lines in the illustrated drawing), and to shift it at an angle position for guiding diffusion reflection light from the second light source 71b to the photoelectric sensor (broken lines in the illustrated drawing).

Further, with respect to the high gloss level reference surface 63 and the low gloss level reference surface 64 in the above-described embodiment, an embodiment has been shown in which reference plates are respectively provided on the flatbed type platen 2, and the image reading is performed at the starting time of the image reading or at the time of calibration, however, this is an embodiment in case the lamps of the light sources, the photoelectric sensor and the like are changed in time. If the changes in time of the lamps of the light sources, the photoelectric sensor and the like are similar both in the main scanning and the sub scanning, it is of course possible that, for example, the maximum gloss output value and the minimum gloss output value may be previously set as experimental values and the set values may be stored in a RAM, without arranging the high gloss level reference surface and the low gloss level reference surface.

[Configuration of the Original Document Feeding Apparatus]

As shown in FIG. 1, the original document feeding apparatus B is disposed above first and the second platens 2 and 3 to cover them, and is provided with a lead roller (original document feeding means) 34 for feeding an original document sheet to the above-mentioned second platen 3 and a discharge roller 22. Further, at the upper stream side of the above-mentioned lead roller 34, there are arranged a paper feeding stacker 23 for stacking and accommodating the original document sheets, a paper feeding roller 24 for separating and feeding each sheet one by one stacked in the paper feeding stacker 23, and a pair of resisting rollers 25 for performing skew correction of the top end of the separated and fed sheet. The illustrated figure "26" represents a paper feeding path for guiding an original document sheet from the paper feeding stacker 23 to the second platen 2, and the illustrated symbol "S1" represents a read sensor for detecting the top end of the original document reached to the platen.

The illustrated apparatus is provided with a backup roller 27 for guiding the original document sheet to the upper side of the second platen 3. This backup roller 27 rotates with the same circumferential velocity as the lead roller 34 to fit the original document sheet on the second platen 3. It may also be possible to provide a backup guide on the upper side of the platen without providing the backup roller 27.

At the downstream side of the above-mentioned discharge roller 22, a paper discharging roller 28 and a paper discharging stacker 29 are arranged. The paper discharging stacker 29 is, as shown in FIG. 1, arranged at the lower side of the paper feeding stacker 23 with an upper and a lower parallel arrangement. On the bottom portion thereof, a platen cover 5 is provided to press and support the original document sheet on the above-mentioned the first platen 3.

Note that the present application claims priorities based on Japanese Patent Application No. 2010-049916 and Japanese Patent Application No. 2010-108623 herein by reference.

EXPLANATION OF SYMBOLS

A image reading apparatus
B original document feeding apparatus
1 apparatus housing
2 first platen
3 the first platen
6 optical carriage
7 condenser lens
8 line sensor
9 light source
9a first light source
9b second light source
10 reflecting mirrors (10a 10e)
10a first mirror (first reflecting member)
10b second reflecting member
10x mirror reflecting surface
10y translucent surface
10z end surface
10w reflecting sheet
11 unit frame
13 light source accommodating portion (light guiding body supporting frame)
18 reflector
20 first light emitter
21 second light emitter
30 light guiding body 31L left end surface
31R right end surface
32 light scattering surface
33 light exiting surface
36 diffusion plate
41 light emitter (41a, 41b)
42 light emitter (42a, 42b)
43 light emitter (43a, 43b)
50 amplifier
51 A/D converting portion
52 shading correction portion
53 color correction portion
54 image data processing portion
55 external interface
56 CCD driver
57 gain setting circuit
58 offset setting circuit
59 A/D threshold setting circuit
60 control CPU
60a light source switching means
61 ROM
62 storing means
63 high gloss level reference surface (first reference plate)
64 low gloss level reference surface (second reference plate)
65a first memory
65b second memory
66 corrected data generating portion
68 image data correcting portion
Ga original document image
R reading surface
So1 maximum gloss output value
So2 minimum gloss output value
So3 white level output value
So4 dark output value
Sd1 gloss pixel data
Sd2 non-gloss pixel data
Sy corrected output value

The invention claimed is:

1. An image reading apparatus for reading an original document by using regular reflection light and diffuse reflection light, comprising:
a platen having a reading surface;
a light source for irradiating light on said reading surface;
a reflecting mirror for reflecting light reflected from said reading surface to a predetermined light path direction;
a condenser lens for condensing light from said reflecting mirror; and
a sensor for subjecting light from said condenser lens into photoelectric conversion;
said light source comprising a first light emitter for mainly irradiating the diffuse reflection light on the original document, and a second light emitter for mainly irradiating the regular reflection light on the original document;
said reflecting mirror comprising a plurality of reflecting members for reflecting light from said reading surface to a predetermined reading path direction;
one of said reflecting members being arranged to be inclined at a predetermined angle with respect to said platen, and comprising a flat-shaped translucent substrate;
a mirror reflecting surface for specularly reflecting light and a translucent surface transmissive for light being formed on a part of the surface of said reflecting member;
said first light emitter being arranged between said platen and the side of the mirror reflecting surface of said reflecting member; and
said second light emitter being arranged at the back surface side of the mirror reflecting surface of said reflecting member,
wherein an irradiating angle of a center of light to be irradiated from said second light emitter to the reading surface is set to be smaller than an irradiating angle of a center of light to be irradiated from said first light emitter to said reading surface, and
said second light emitter is arranged in such a way that the center of light to be irradiated on said reading surface passes through the translucent surface between the end surface of said reflecting member and said mirror reflecting surface.

2. The image reading apparatus as claimed in claim 1, wherein
the amount of light from said first light emitter is larger than the amount of light from said second light emitter.

3. The image reading apparatus as claimed in claim 1, wherein
said first and the second light emitters comprise light emitting diodes and light guiding bodies for deflecting light from the light emitting diodes into linear light.

4. The image reading apparatus as claimed in claim 1, wherein
said mirror reflecting surface and said translucent surface are formed on a first reflecting member, among the plurality of the reflecting members comprising said reflecting mirror, for reflecting, at first, the reflected light from said reading surface, and
said second light emitter is arranged at the back surface of said first reflecting member.

5. An image reading apparatus for reading an original document by using regular reflection light and diffuse reflection light, comprising:
a platen having a reading surface;
a light source for irradiating light on said reading surface;
a reflecting mirror for reflecting light reflected from said reading surface to a predetermined light path direction;
a condenser lens for condensing light from said reflecting mirror; and
a sensor for subjecting light from said condenser lens into photoelectric conversion;
said light source comprising a first light emitter for mainly irradiating the diffuse reflection light on the original document, and a second light emitter for mainly irradiating the regular reflection light on the original document;
said reflecting mirror comprising a plurality of reflecting members for reflecting light from said reading surface to a predetermined reading path direction;
said reflecting mirror comprising:
a first reflecting member for reflecting, at first, the reflected light from said reading surface; and
a second reflecting member for reflecting light from said first reflecting member to a predetermined reading path direction;
said second reflecting member being arranged to be inclined at a predetermined angle with respect to said platen, and comprising a flat-shaped translucent substrate;
a mirror reflecting surface for specularly reflecting light and a translucent surface transmissive for light being formed on a part of the surface of said second reflecting member;

said first light emitter being arranged between said platen and said first reflecting member; and said second light emitter being arranged at the back surface side of said second reflecting member in such a way that light passes through the translucent surface of said second reflecting member and irradiates said reading surface.

6. The image reading apparatus as claimed in claim 1, wherein with respect to said reflecting member having said mirror reflecting surface and said translucent surface, said translucent surface is formed at a position near said reading surface, and said mirror reflecting surface is formed at a position far from said reading surface.

7. The image reading apparatus as claimed in claim 6, wherein an end surface adjacent to the translucent surface of said reflecting member is chamfered to be nearly parallel to said reading surface.

8. The image reading apparatus as claimed in claim 6, wherein on a back surface of said reflecting member, a reflecting surface for reflecting light to a position opposite to the mirror reflecting surface formed on the front surface side is formed; and the reflecting surface is formed in such a way that light irradiated from said second light emitter and reflected by said mirror reflecting surface is reflected to direct to said reading surface.

9. An image reading apparatus for reading an original document by using regular reflection light and diffuse reflection light, comprising:

a platen having a reading surface;

a light source for irradiating light on said reading surface;

a reflecting mirror for reflecting light reflected from said reading surface to a predetermined light path direction;

a condenser lens for condensing light from said reflecting mirror; and a sensor for subjecting light from said condenser lens into photoelectric conversion;

said light source comprising a first light emitter for mainly irradiating the diffuse reflection light on the original document, and a second light emitter for mainly irradiating the regular reflection light on the original document;

said reflecting mirror comprising a plurality of reflecting members for reflecting light from said reading surface to a predetermined reading path direction;

one of said reflecting members being arranged to be inclined at a predetermined angle with respect to said platen, and comprising a flat-shaped translucent substrate;

a mirror reflecting surface for specularly reflecting light and a translucent surface transmissive for light being formed on a part of the surface of said reflecting member;

said first light emitter being arranged between said platen and the side of the mirror reflecting surface of said reflecting member;

said second light emitter being arranged at the back surface side of the mirror reflecting surface of said reflecting member in such a way that light passes through the translucent surface of said reflecting member to irradiate said reading surface;

with respect to said reflecting member having the mirror reflecting surface and the translucent surface, said mirror reflecting surface being formed nearly at the central portion of the reflecting member, and said translucent surface being formed nearly at the both ends of the reflecting member; and said second light emitter being arranged to irradiate light from the translucent surface formed at the both ends to said reading surface.

10. The image reading apparatus as claimed in claim 1, wherein at the back surface side of said reflecting member, a reflector for reflecting light from said second light emitter to a predetermined direction is arranged; and said reflector has a deflection characteristic to focus light from the second light emitter to said reading surface.

11. An image reading apparatus for reading an original document by using regular reflection light and diffuse reflection light, comprising:

a platen having a reading surface;

a light source for irradiating light on said reading surface;

a reflecting mirror for reflecting light reflected from said reading surface to a predetermined light path direction;

a condenser lens for condensing light from said reflecting mirror; and a sensor for subjecting light from said condenser lens into photoelectric conversion;

said light source comprising a first light emitter for mainly irradiating the diffuse reflection light on the original document, and a second light emitter for mainly irradiating the regular reflection light on the original document;

said reflecting mirror comprising a plurality of reflecting members for reflecting light from said reading surface to a predetermined reading path direction;

one of said reflecting members being arranged to be inclined at a predetermined angle with respect to said platen, and comprising a flat-shaped translucent substrate;

a mirror reflecting surface for specularly reflecting light and translucent surfaces transmissive for light being formed on a part of the surface of said reflecting member;

said first light emitter being arranged between said platen and the side of the mirror reflecting surface of said reflecting member;

said second light emitter being arranged at the back surface side of said reflecting member in such a way that light passes through the translucent surfaces of said reflecting member to irradiate said reading surface; and at the back surface side of the mirror reflecting surface of said reflecting member, a reflector for reflecting light from said second light emitter to a predetermined direction being arranged;

said reflector having a first reflecting surface for irradiating light from one of said translucent surfaces formed on both sides of said mirror reflecting surface to said reading surface, and a second reflecting surface for irradiating light from the other of said translucent surfaces to said reading surface.

12. The image reading apparatus as claimed in claim 11, wherein said reflector is configured in such a way that light from the second light emitter is branched and projected from said first reflecting surface to one of the translucent surfaces, and from said second reflecting surface to the other of the translucent surfaces.

13. The image reading apparatus as claimed in claim 11, wherein
said first reflecting surface and second reflecting surface branch light from said second light emitter in such a way that the amounts of light respectively projected to said translucent surfaces are nearly the same.

14. The image reading apparatus as claimed in claim 11, wherein
said first reflecting surface and said second reflecting surface branch light from said second light emitter in such a way that, on said reflecting member, the amount of light projected on the mirror reflecting surface at the central portion is smaller, and the amount of light projected on the translucent surfaces at the both ends is larger.

15. The image reading apparatus as claimed in claim 11, wherein
said first reflecting surface and second reflecting surface are formed to have a curved shape for focusing light from said second light emitter to project on said translucent surface.

16. The image reading apparatus as claimed in claim 11, wherein
said first reflecting surface and second reflecting surface form surfaces having different central points.

17. The image reading apparatus as claimed in claim 1, wherein
the mirror reflecting surface of said reflecting member is formed to totally reflect and block out light from said second light emitter.

18. The image reading apparatus as claimed in claim 11, wherein
said second light emitter comprises a first and a second light emitting portions for respectively emitting linear light; and
said first light emitter is arranged to project light on said first reflecting surface, and said second light emitter is arranged to project light on said second reflecting surface.

* * * * *